US011609090B2

(12) United States Patent
Buback et al.

(10) Patent No.: US 11,609,090 B2
(45) Date of Patent: *Mar. 21, 2023

(54) MOBILE SYSTEM AND METHOD OF SCANNING AN ENVIRONMENT

(71) Applicant: FARO Technologies, Inc., Lake Mary, FL (US)

(72) Inventors: Johannes Buback, Korntal-Munchingen (DE); Igor Sapina, Kornwestheim (DE); Julian Becker, Korntal-Münchingen (DE); Martin Ossig, Tamm (DE); Aleksej Frank, Kornwestheim (DE); Ahmad Ramadneh, Kornwestheim (DE); Oliver Zweigle, Stuttgart (DE); João Santos, Kornwestheim (DE)

(73) Assignee: FARO Technologies, Inc., Lake Mary, FL (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/178,591

(22) Filed: Feb. 18, 2021

(65) Prior Publication Data

US 2021/0172735 A1 Jun. 10, 2021

Related U.S. Application Data

(63) Continuation of application No. 16/567,575, filed on Sep. 11, 2019, now Pat. No. 10,989,532, which is a
(Continued)

(51) Int. Cl.
*G01B 11/00* (2006.01)
*G01C 3/02* (2006.01)
(Continued)

(52) U.S. Cl.
CPC ............... *G01C 3/02* (2013.01); *G01B 5/008* (2013.01); *G01B 11/005* (2013.01);
(Continued)

(58) Field of Classification Search
CPC .............. G01B 11/002; G06T 7/521; G06T 2207/10028; B25J 5/007; B25J 9/06; B25J 9/162; G01C 21/16; G01C 21/32
(Continued)

(56) References Cited

U.S. PATENT DOCUMENTS

| 6,614,538 B1* | 9/2003 | Basler ................. A61C 9/0053 433/29 |
| 8,699,036 B2* | 4/2014 | Ditte ..................... G01C 22/025 356/141.5 |

(Continued)

FOREIGN PATENT DOCUMENTS

| EP | 3382337 A1 | 10/2018 |
| GB | 2551609 A | 12/2017 |
| WO | 2014068406 A2 | 5/2014 |

OTHER PUBLICATIONS

European Search Report for Application No. 19201247.4 dated Feb. 10, 2020; 8 pgs.
(Continued)

*Primary Examiner* — Isiaka O Akanbi
(74) *Attorney, Agent, or Firm* — McCarter & English, LLP; Dave S. Christensen

(57) ABSTRACT

A system and method for measuring three-dimensional (3D) coordinate values of an environment is provided. The system includes a movable base unit a first scanner and a second scanner. One or more processors performing a method that includes causing the first scanner to determine first plurality of coordinate values in a first frame of reference based on an emitted first beam of light and a received first reflected light.
(Continued)

The second scanner determines a second plurality of 3D coordinate values in a second frame of reference as the base unit is moved from a first position to a second position. The determining of the first coordinate values and the second plurality of 3D coordinate values being performed simultaneously. The second plurality of 3D coordinate values are registered in a common frame of reference based on the first plurality of coordinate values.

20 Claims, 27 Drawing Sheets

Related U.S. Application Data continuation-in-part of application No. 16/154,240, filed on Oct. 8, 2018, now Pat. No. 10,914,569.

(51) Int. Cl.
| | | |
|---|---|---|
| *G01B 5/008* | (2006.01) | |
| *G01S 17/06* | (2006.01) | |
| *G01C 21/16* | (2006.01) | |
| *G06T 7/70* | (2017.01) | |

(52) U.S. Cl.
CPC .......... *G01C 21/1656* (2020.08); *G01S 17/06* (2013.01); *G06T 7/70* (2017.01); *G06T 2200/04* (2013.01); *G06T 2207/10028* (2013.01)

(58) Field of Classification Search
USPC .................................. 356/614–626
See application file for complete search history.

(56) References Cited

U.S. PATENT DOCUMENTS

| | | | |
|---|---|---|---|
| 8,705,012 | B2 | 4/2014 | Greiner et al. |
| 9,632,504 | B1 | 4/2017 | Watts |
| 10,408,606 | B1 * | 9/2019 | Raab ..................... G06T 7/0014 |
| 10,739,458 | B2 * | 8/2020 | Zweigle .................. B25J 13/08 |
| 10,914,569 | B2 | 2/2021 | Zweigle et al. |
| 10,989,532 | B2 * | 4/2021 | Buback ................ G01C 21/206 |
| 2006/0193521 | A1 | 8/2006 | England et al. |
| 2007/0067104 | A1 | 3/2007 | Mays |
| 2012/0035788 | A1 | 2/2012 | Trepagnier et al. |
| 2013/0070250 | A1 * | 3/2013 | Ditte ....................... G01S 17/89 |
| | | | 356/445 |
| 2015/0160342 | A1 | 6/2015 | Zweigle et al. |
| 2015/0160343 | A1 | 6/2015 | Zweigle et al. |
| 2015/0160347 | A1 | 6/2015 | Zweigle et al. |
| 2015/0160348 | A1 | 6/2015 | Zweigle |
| 2015/0269792 | A1 | 9/2015 | Wood |
| 2016/0260054 | A1 | 9/2016 | High et al. |
| 2016/0291160 | A1 | 10/2016 | Zweigle et al. |
| 2016/0327383 | A1 | 11/2016 | Becker et al. |
| 2017/0054965 | A1 | 2/2017 | Raab et al. |
| 2017/0144682 | A1 | 5/2017 | Kamei et al. |
| 2017/0184711 | A1 * | 6/2017 | Becker ................ G01C 15/002 |
| 2020/0109937 | A1 | 4/2020 | Zweigle |
| 2020/0109943 | A1 | 4/2020 | Buback |
| 2020/0191555 | A1 | 6/2020 | Zweigle |
| 2020/0355488 | A1 | 11/2020 | Zweigle et al. |

OTHER PUBLICATIONS

European Search Report for Application No. 20195114.2 dated Jan. 25, 2021; 90pgs.

* cited by examiner

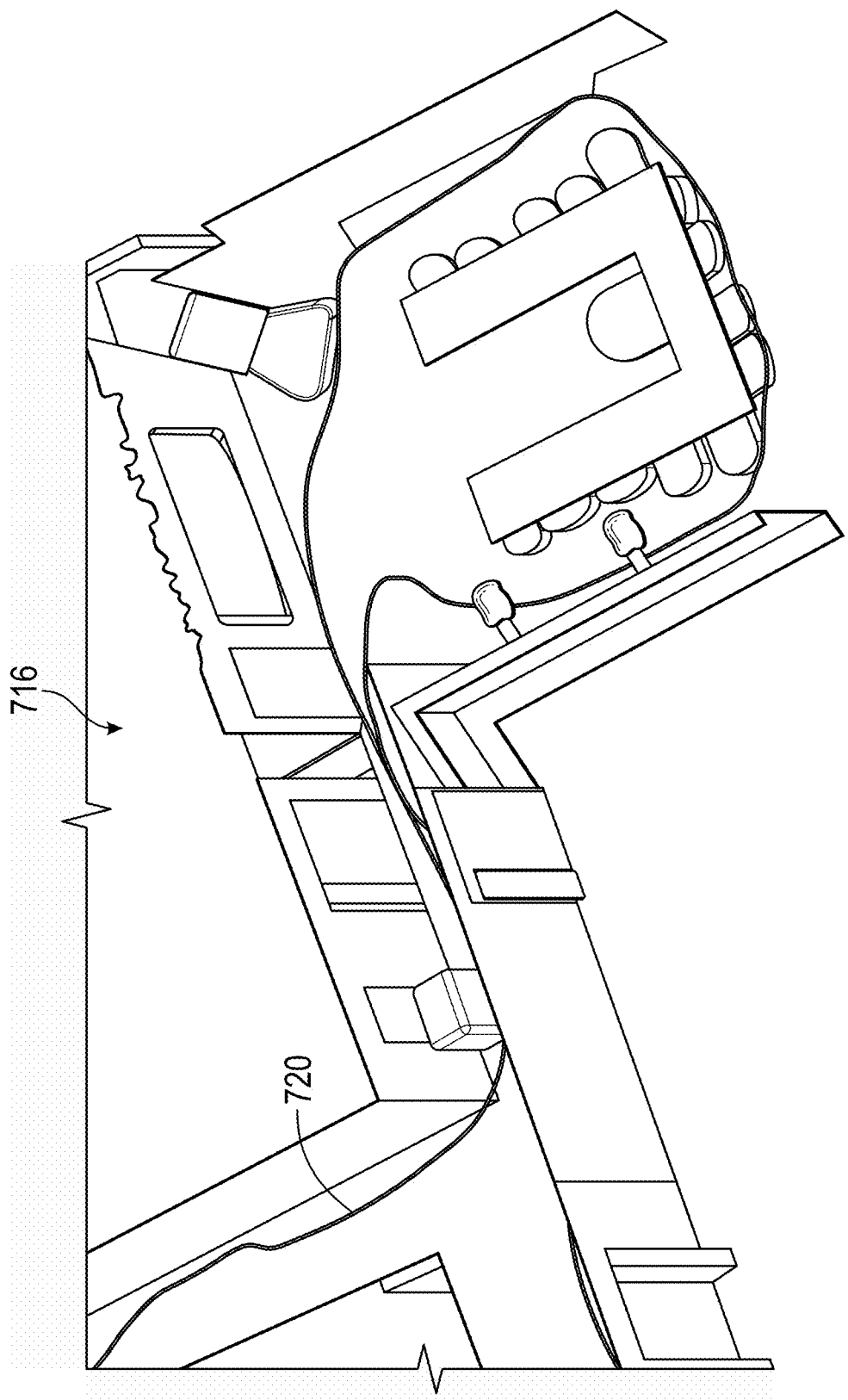

MOBILE SYSTEM AND METHOD OF SCANNING AN ENVIRONMENT

CROSS-REFERENCE TO RELATED APPLICATIONS

The present application is a continuation of U.S. patent application Ser. No. 16/567,575 filed Sep. 11, 2019, which is a continuation-in-part application of U.S. patent application Ser. No. 16/154,240 filed on Oct. 8, 2018, the contents of which are incorporated by reference herein.

BACKGROUND

The present application is directed to a system that optically scans an environment, such as a building, and in particular to a mobile scanning system that generates three-dimensional scans of the environment.

The automated three-dimensional (3D) scanning of an environment is desirable as a number of scans may be performed in order to obtain a complete scan of the area. 3D coordinate scanners include time-of-flight (TOF) coordinate measurement devices. A TOF laser scanner is a scanner in which the distance to a target point is determined based on the speed of light in air between the scanner and a target point. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

It should be appreciated that where an object (e.g. a wall, a column, or a desk) blocks the beam of light, that object will be measured but any objects or surfaces on the opposite side will not be scanned since they are in the shadow of the object relative to the scanner. Therefore, to obtain a more complete scan of the environment, the TOF scanner is moved to different locations and separate scans are performed. Subsequent to the performing of the scans, the 3D coordinate data (i.e. the point cloud) from each of the individual scans are registered to each other and combined to form a 3D image or model of the environment.

Some existing measurement systems have been mounted to a movable structure, such as a cart, and moved on a continuous basis through the building to generate a digital representation of the building. However, these provide generally lower data quality than stationary scans. These systems tend to be more complex and require specialized personnel to perform the scan. Further, the scanning equipment including the movable structure may be bulky, which could further delay the scanning process in time sensitive situations, such as a crime or accident scene investigation.

Further, even though the measurement system is mounted to a movable cart, the cart is stopped at scan locations so that the measurements can be performed. This further increases the time to scan an environment.

Accordingly, while existing scanners are suitable for their intended purposes, what is needed is a system for having certain features of embodiments of the present invention.

BRIEF DESCRIPTION

According to one aspect of the invention, a system for measuring three-dimensional (3D) coordinate values of an environment is provided. The system includes a movable base unit. A first scanner is coupled to the base unit, the scanner having a light source, an image sensor and a controller, the light source emitting a first beam of light and the image sensor being arranged to receive a first reflected light of the first beam of light. A second scanner is coupled to the base unit, the second scanner operable to selectively measure 3D coordinates of surfaces in the environment, the second scanner having a rotary mirror arranged to reflect an emitted second beam of light and a second reflected light. One or more processors are operably coupled to the base unit, the scanner and the 3D scanner, the one or more processors being responsive to nontransitory executable instructions for performing a method comprising: causing the first scanner to determine first plurality of coordinate values in a first frame of reference based at least in part on the emitted first beam of light and the received first reflected light; causing the second scanner to determining a second plurality of 3D coordinate values in a second frame of reference as the base unit is moved from a first position to a second position, the determining of the first coordinate values and the second plurality of 3D coordinate values being performed simultaneously; registering the second plurality of 3D coordinate values a common frame of reference based at least in part on the first plurality of coordinate values.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 32 is a point cloud image of a portion of the environment acquired using the method of FIG. 30.

Figure 1:
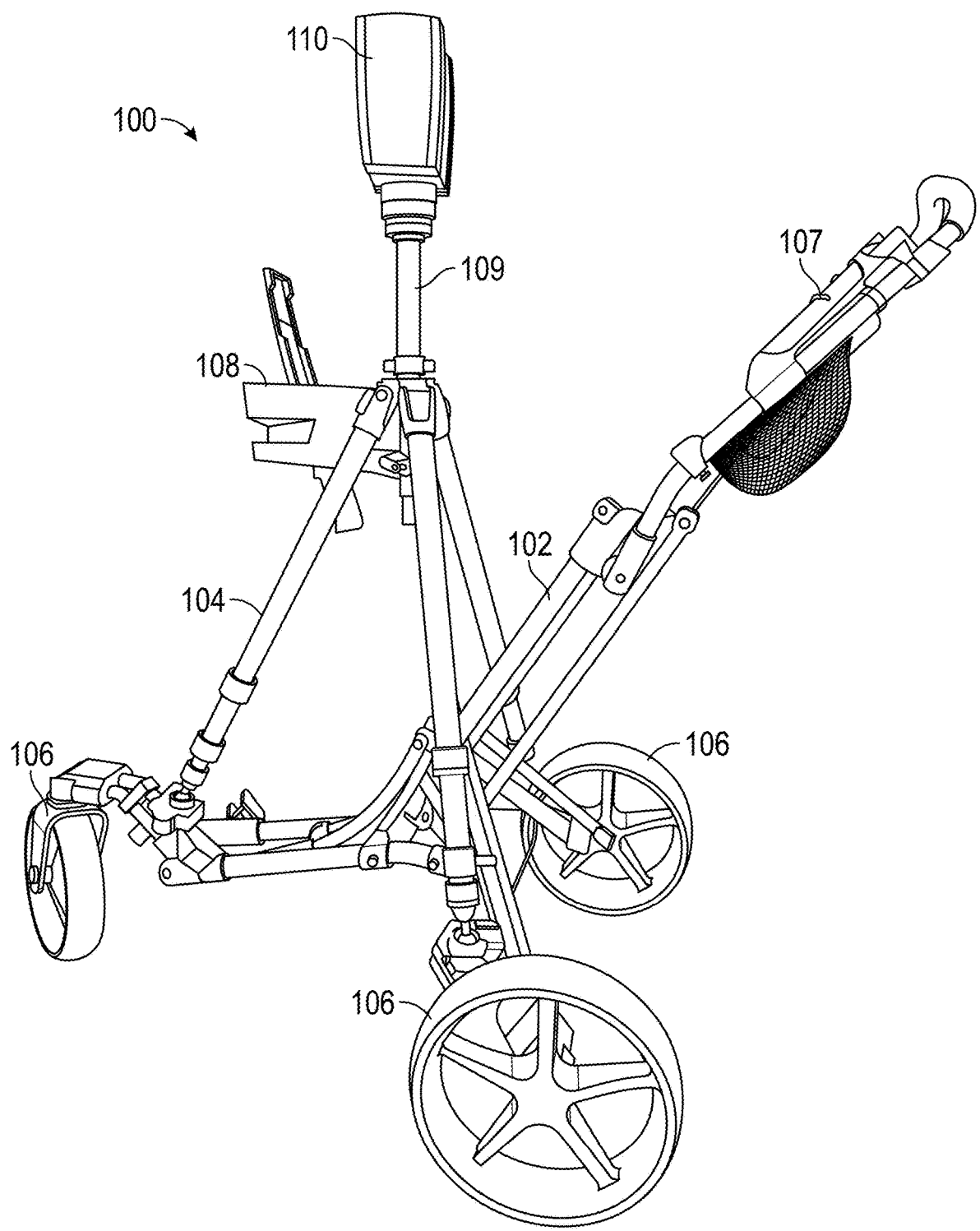
FIG. 1 is a perspective view of a mobile scanning platform according to an embodiment.
Figure 2:
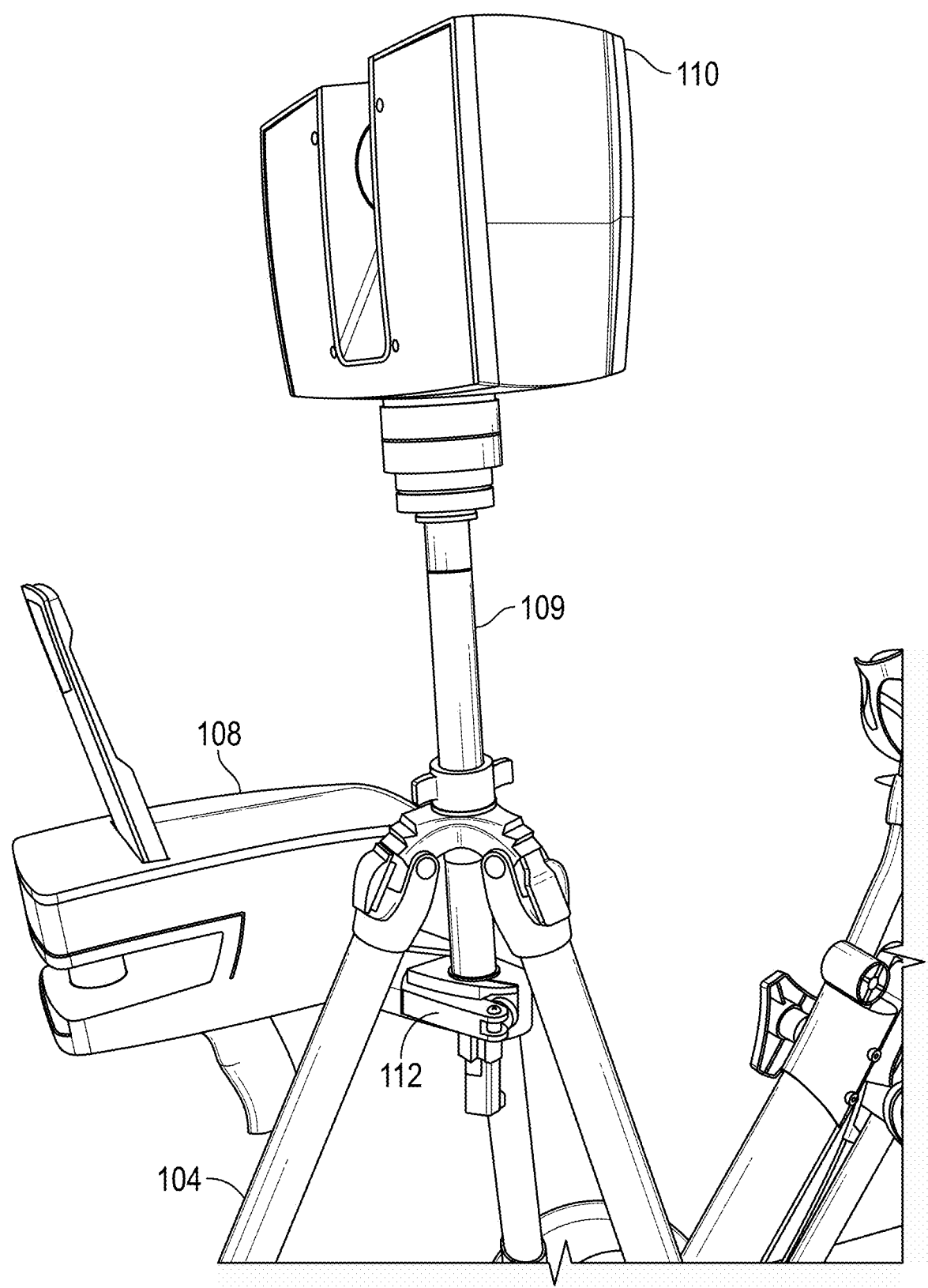
FIGS. 2-4 are various perspective views of the mobile scanning platform of FIG. 1.
Figure 3:
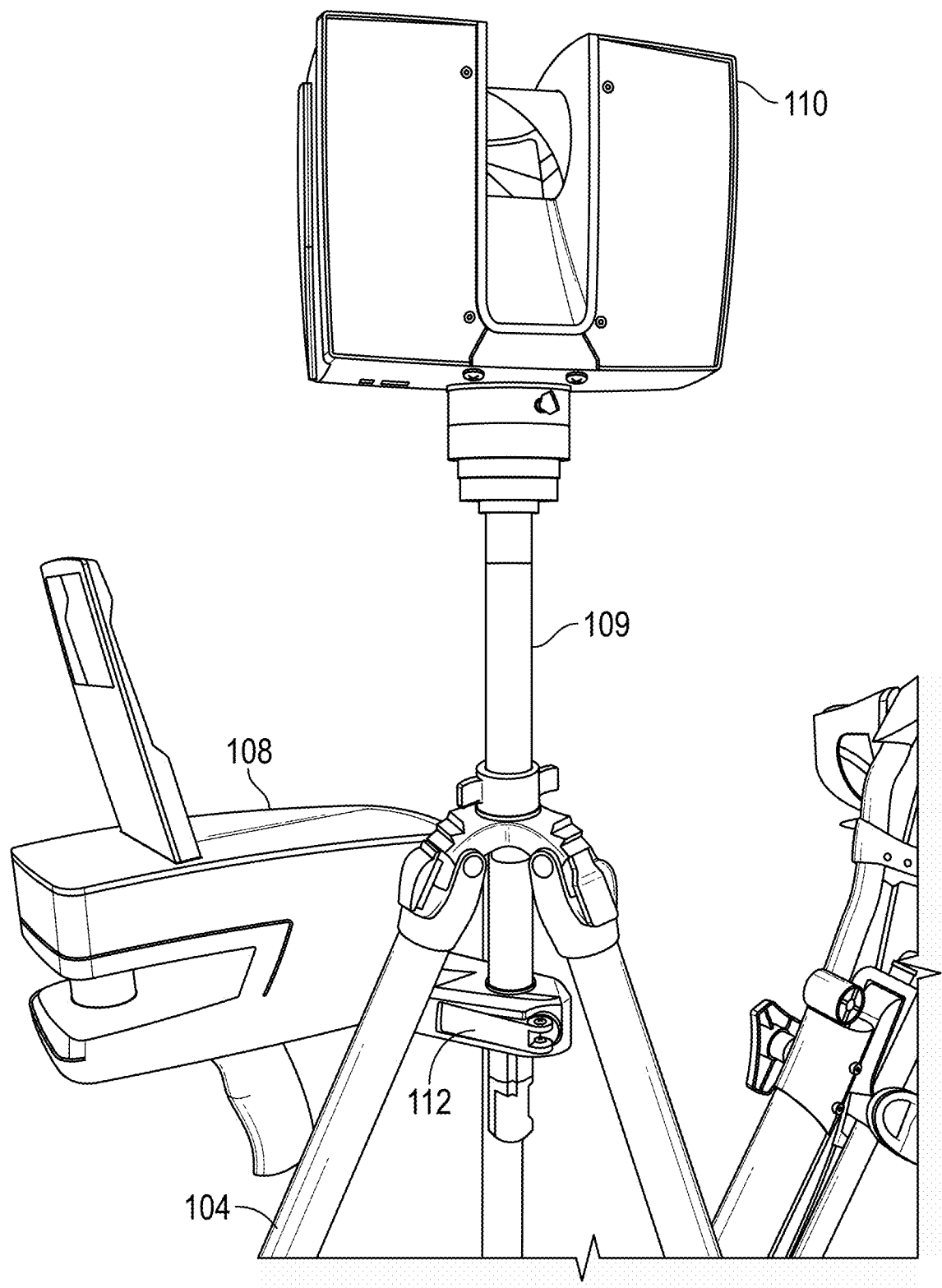
Figure 4:
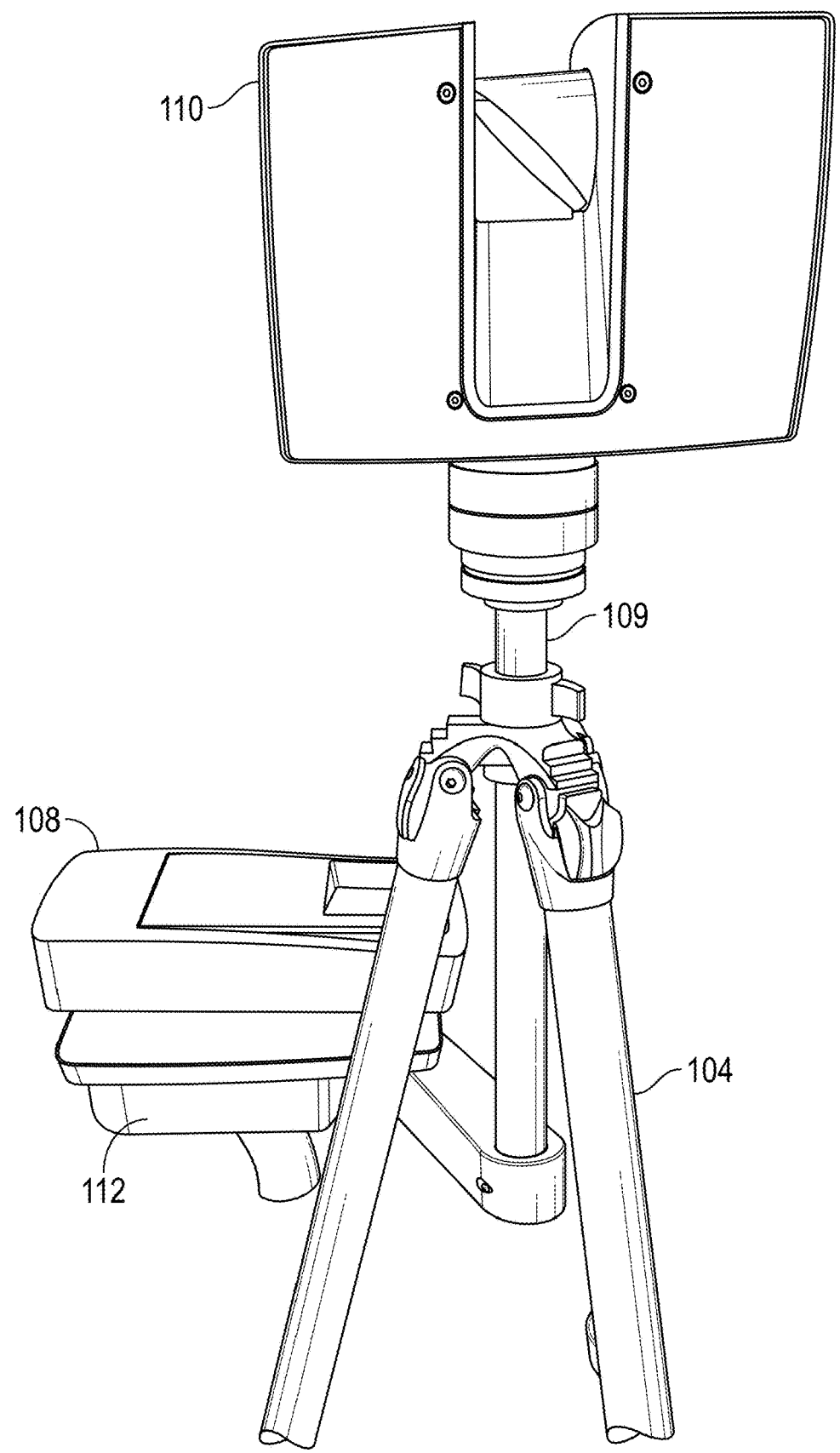

The detailed description explains embodiments of the invention, together with advantages and features, by way of example with reference to the drawings.

DETAILED DESCRIPTION

Embodiments of the present disclosure relate to a mobile scanning platform that allows for simultaneous 3D scanning, 3D map and 3D trajectory generation of an environment while the platform is moving. Embodiments of the present disclosure relate to a mobile scanning platform that allows for faster scanning of an environment. Embodiments of the present disclosure provide for a mobile scanning platform that may be used to scan an environment in an autonomous or semi-autonomous manner.

Referring now to FIGS. 1-4, an embodiment is shown of a mobile scanning platform 100. The platform 100 includes a frame 102 having a tripod portion 104 thereon. The frame 102 further includes a plurality of wheels 106 that allow the platform 100 to be moved about an environment. The frame 102 further includes a handle portion 107 that provides a convenient place for the operator to push and maneuver the platform 100.

The tripod portion 104 includes a center post 109. In an embodiment, the center post 109 generally extends generally perpendicular to the surface that the platform 100 is on. Coupled to the top of the post 109 is a 3D measurement device 110. In the exemplary embodiment, the 3D measurement device 110 is a time-of-flight type scanner (either phase-based or pulse-based) that emits and receives a light to measure a volume about the scanner. In the exemplary embodiment, the 3D measurement device 110 is the same as that described in reference to FIGS. 27-29 herein.

Also attached to the center post 109 is a 2D scanner 108. In an embodiment, the 2D scanner 108 is the same type of scanner as is described in reference to FIGS. 9-26 herein. In the exemplary embodiment, the 2D scanner emits light in a plane and measures a distance to an object, such as a wall for example. As described in more detail herein, these distance measurements may be used to generate a 2D map of an environment when the 2D scanner 108 is moved therethrough. The 2D scanner 108 is coupled to the center post by an arm 112 that includes an opening to engage at least the handle portion of the 2D scanner 108.

In an embodiment, one or both of the 3D scanner 110 and the 2D scanner 108 are removably coupled from the platform 100. In an embodiment, the platform 100 is configured to operate (e.g. operate the scanners 108, 110) while the platform 100 is being carried by one or more operators.

In an embodiment, the mobile scanning platform 100 may include a controller (not shown) that is coupled to communicate with both the 2D scanner 108 and the 3D measurement device 110.

Figure 5:
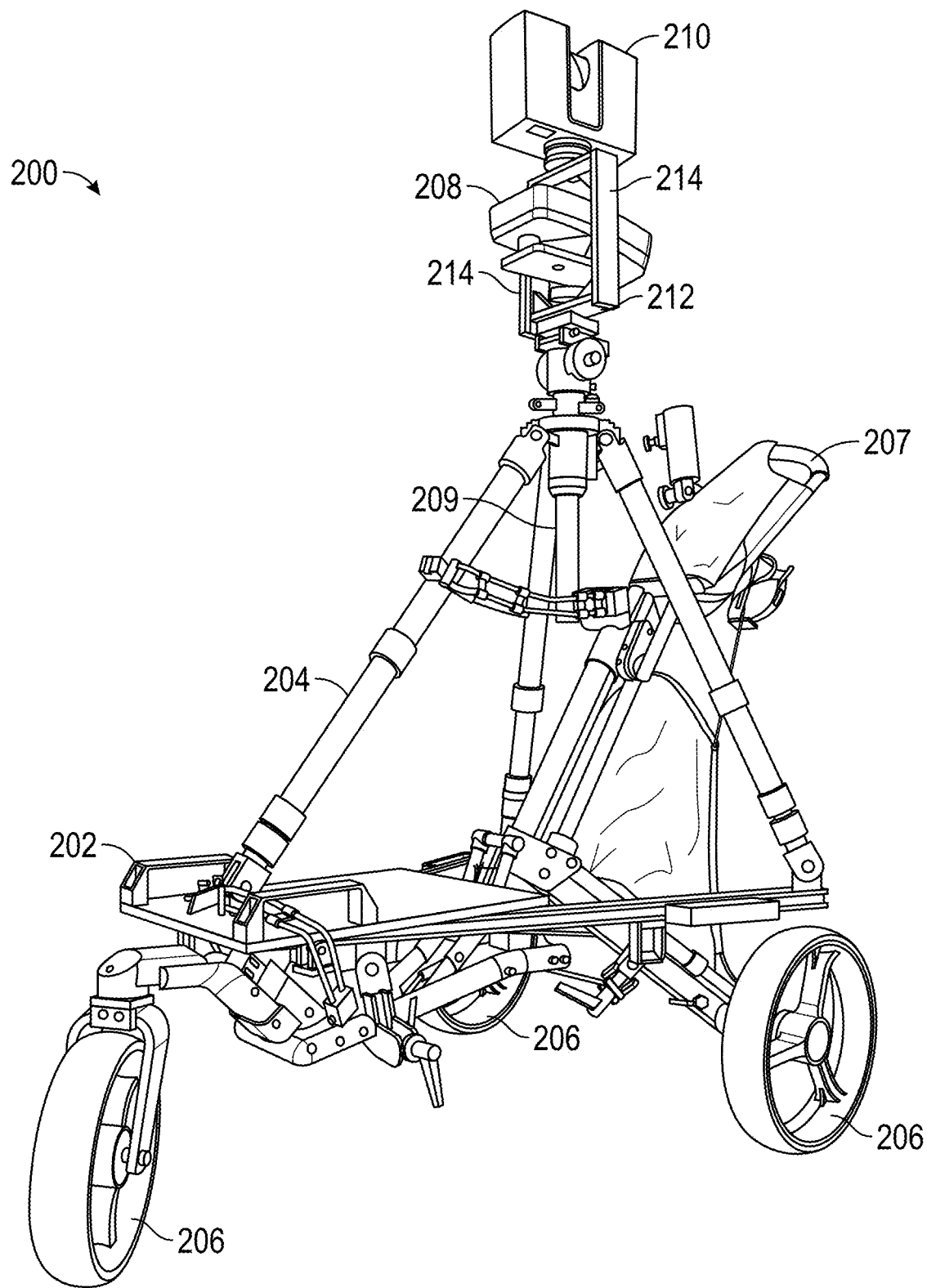
FIG. 5 is a perspective view of the mobile scanning platform according to another embodiment.

Referring now to FIG. 5, another embodiment is shown of a mobile scanning platform 200. The scanning platform 200 is similar to the platform 100 in that it has a frame 202 with a tripod 204 mounted thereon. The frame includes a plurality of wheels 206 and a handle portion 207.

In this embodiment, the center post 209 includes a holder 212 mounted between the post 209 and a 3D measurement device 210. The holder 212 includes a pair of arms 214 that define an opening therebetween. Mounted within the opening a 2D scanner 208. In an embodiment, the 2D scanner 208 is mounted coaxial with the post 209 and the axis of rotation of the 3D measurement device 210.

Is should be appreciated that the platforms 100, 200 are manually pushed by an operator through the environment. As will be discussed in more detail herein, as the platform 100, 200 is moved through the environment, both the 2D scanner 108, 208 and the 3D measurement device 110, 210 are operated simultaneously, with the data of the 2D measurement device being used, at least in part, to register the data of the 3D measurement system.

Figure 6:
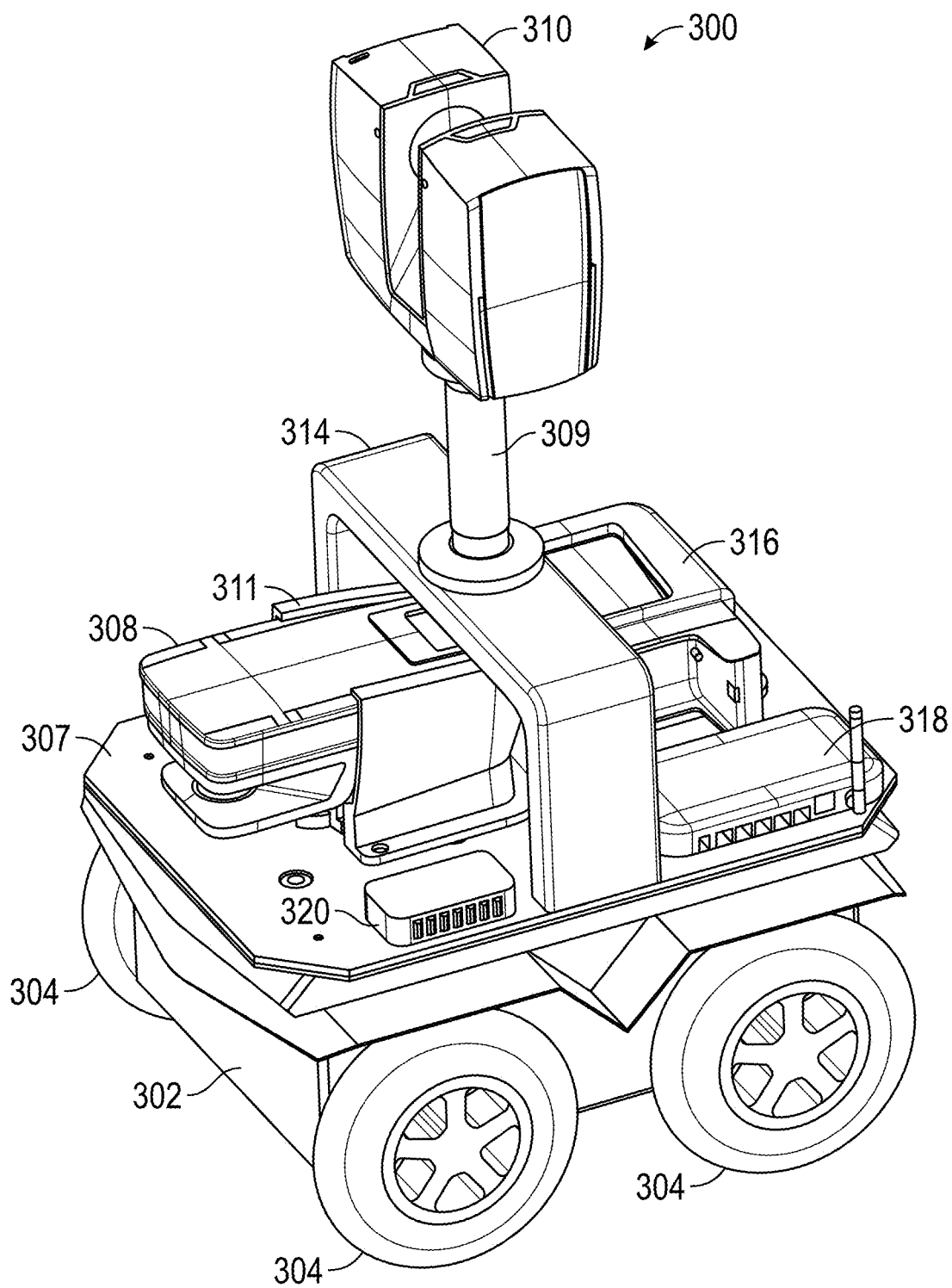
FIG. 6 is a perspective view of a mobile scanning platform in accordance with another embodiment.
Figure 7:
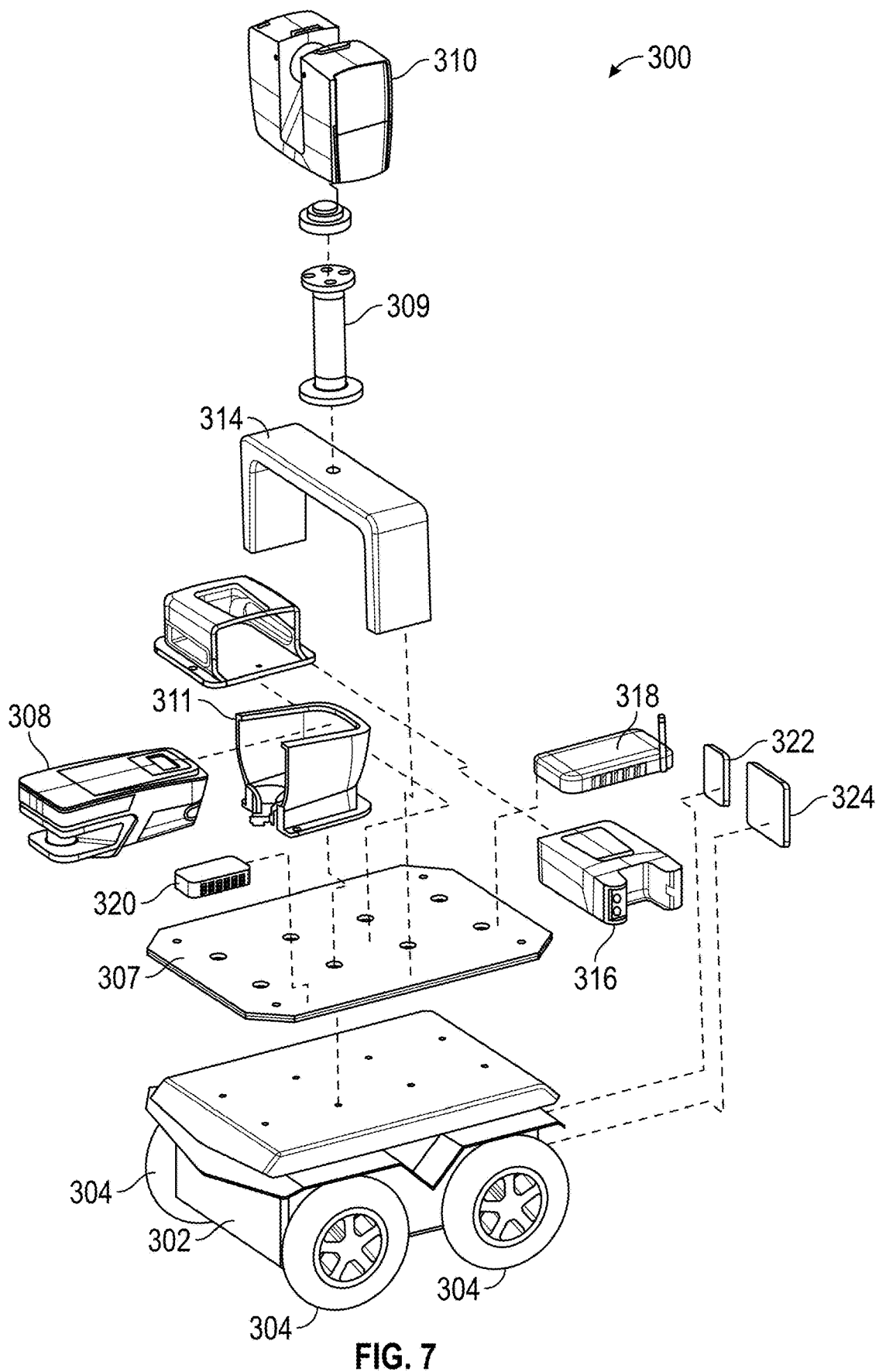
FIG. 7 is an unassembled view of the mobile scanning platform of FIG. 6.
Figure 8:
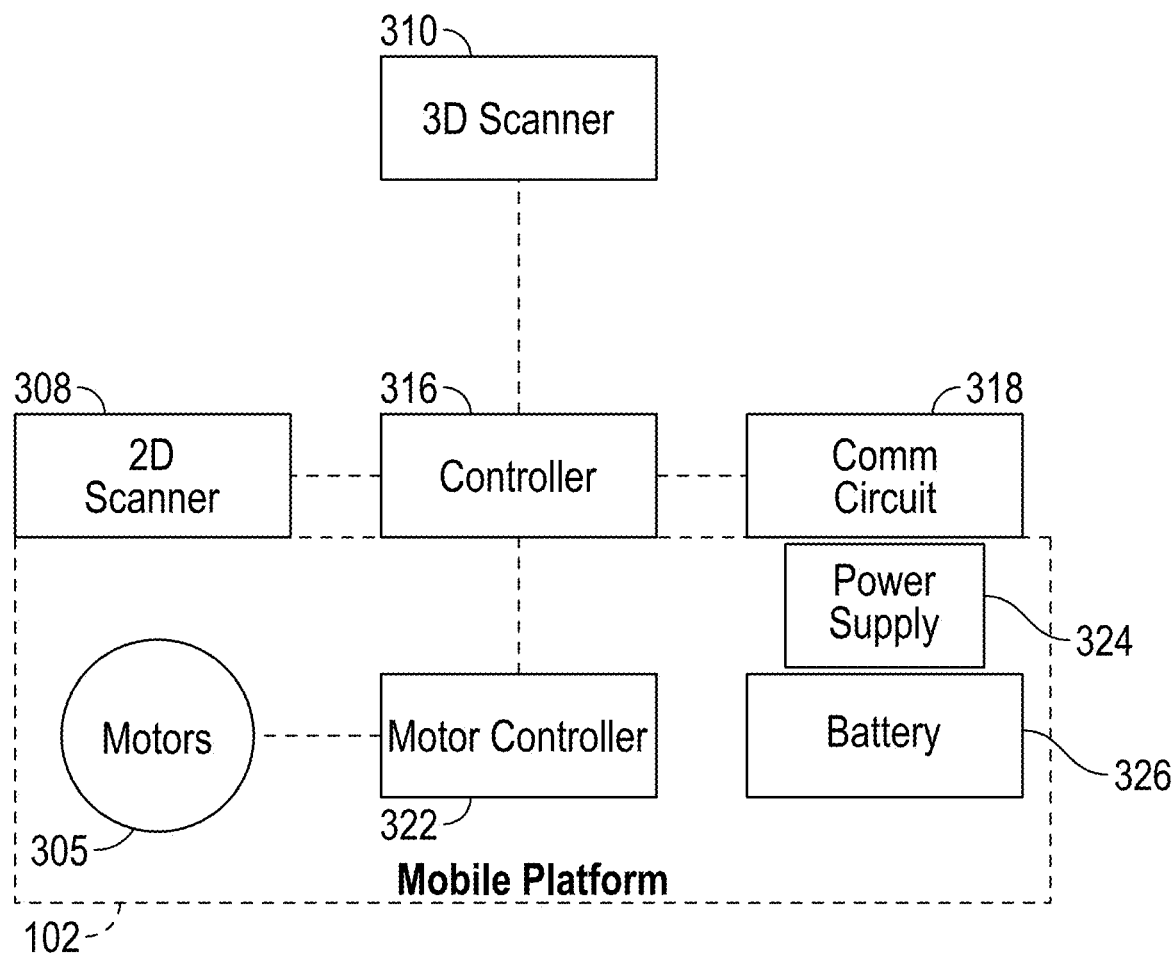
FIG. 8 is a block diagram of the system of FIG. 6.
Figure 9:
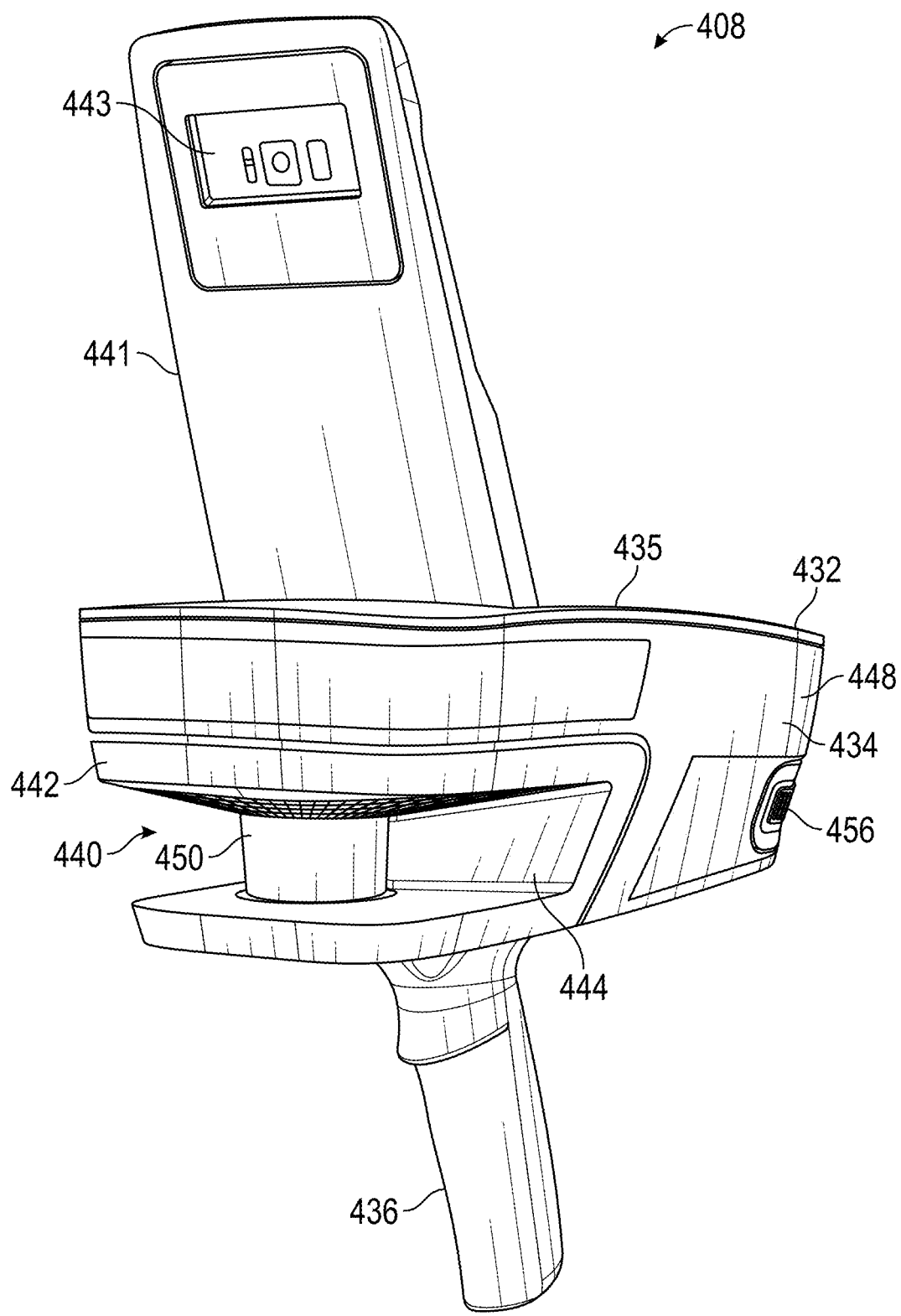
FIGS. 9-11 are perspective views of a two-dimensional (2D) scanning and mapping system for use with the mobile scanning platform of FIG. 1, FIG. 5 or FIG. 6, in accordance with an embodiment.
Figure 10:
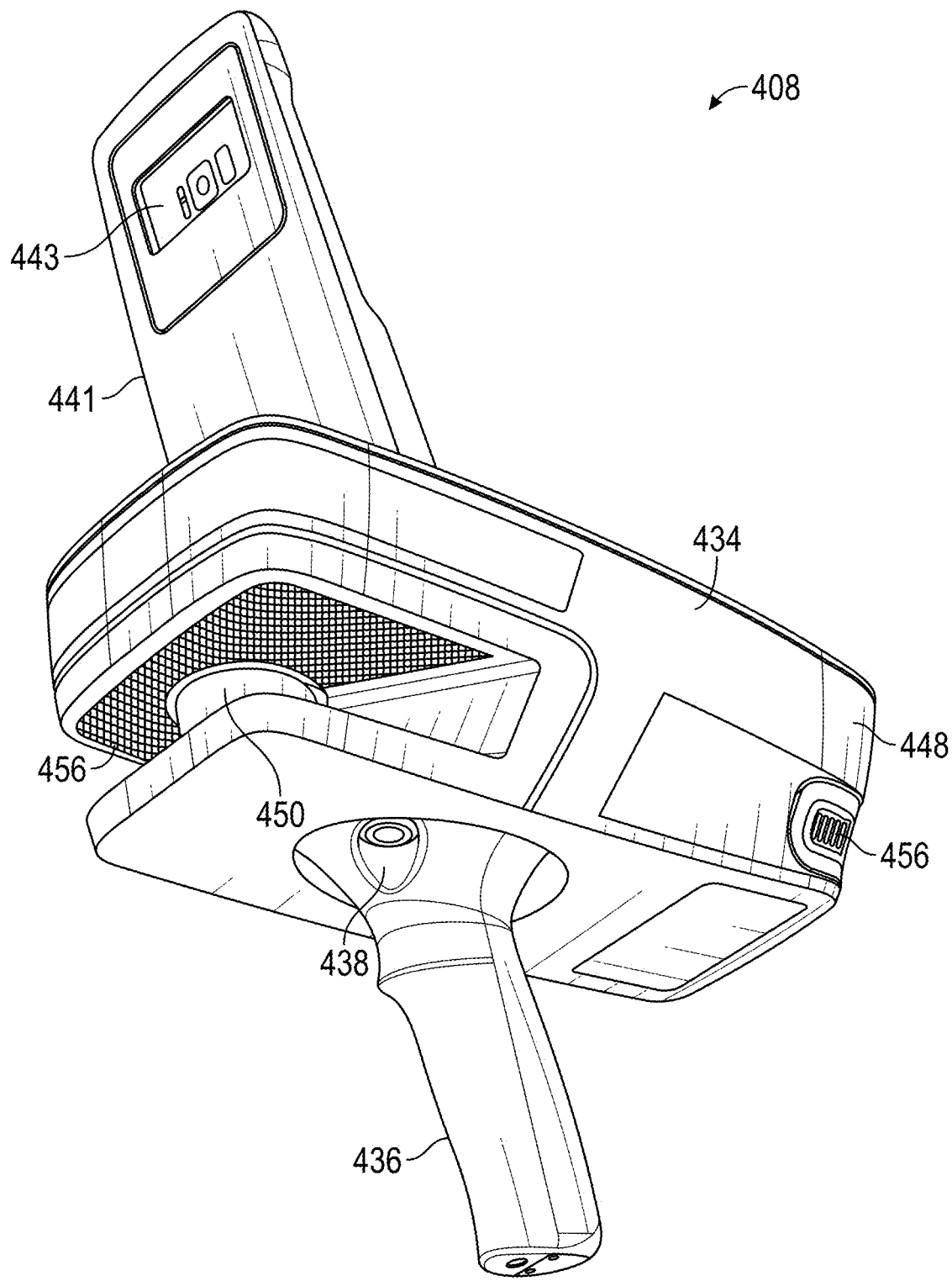
Figure 11:
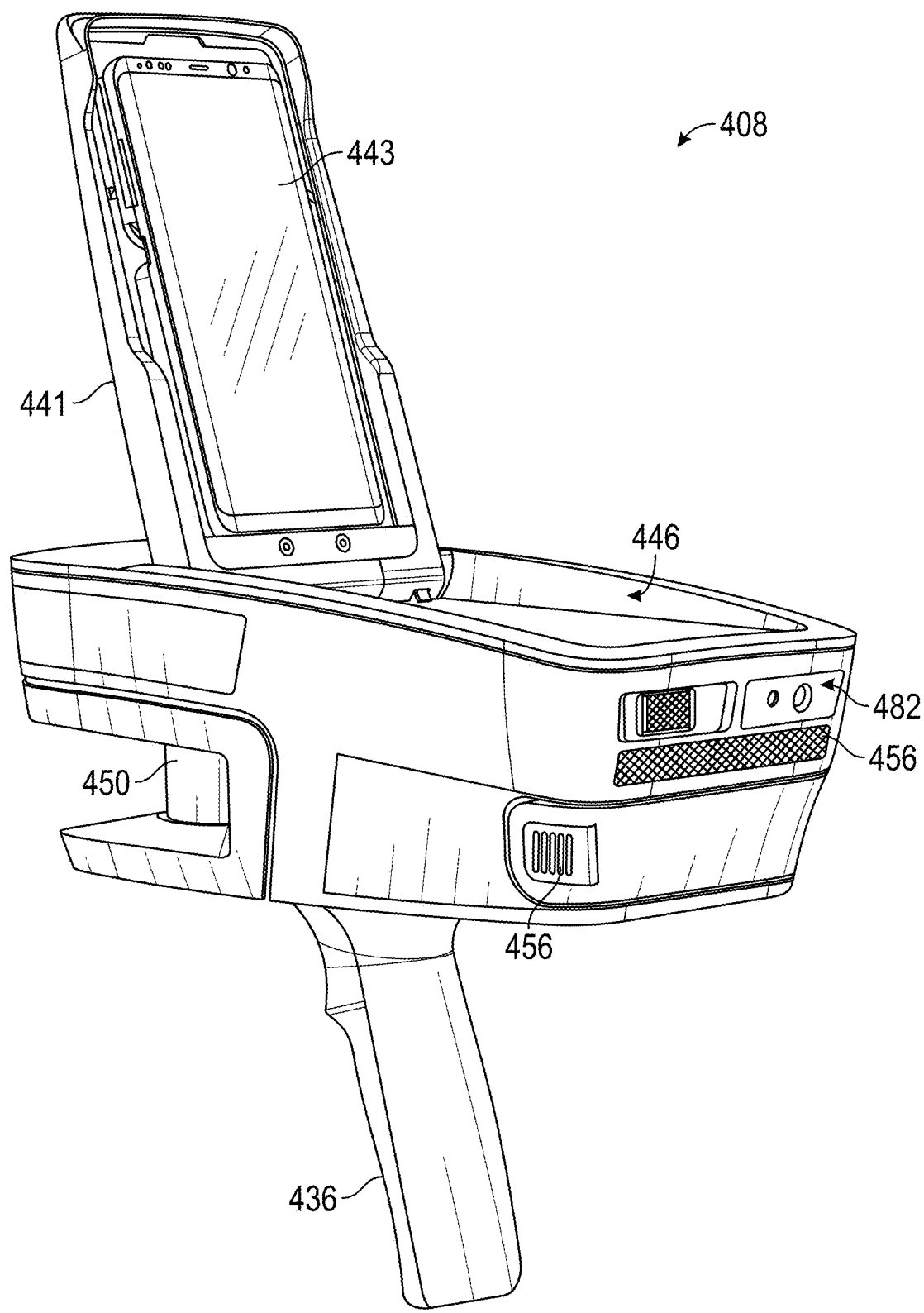
Figure 12:
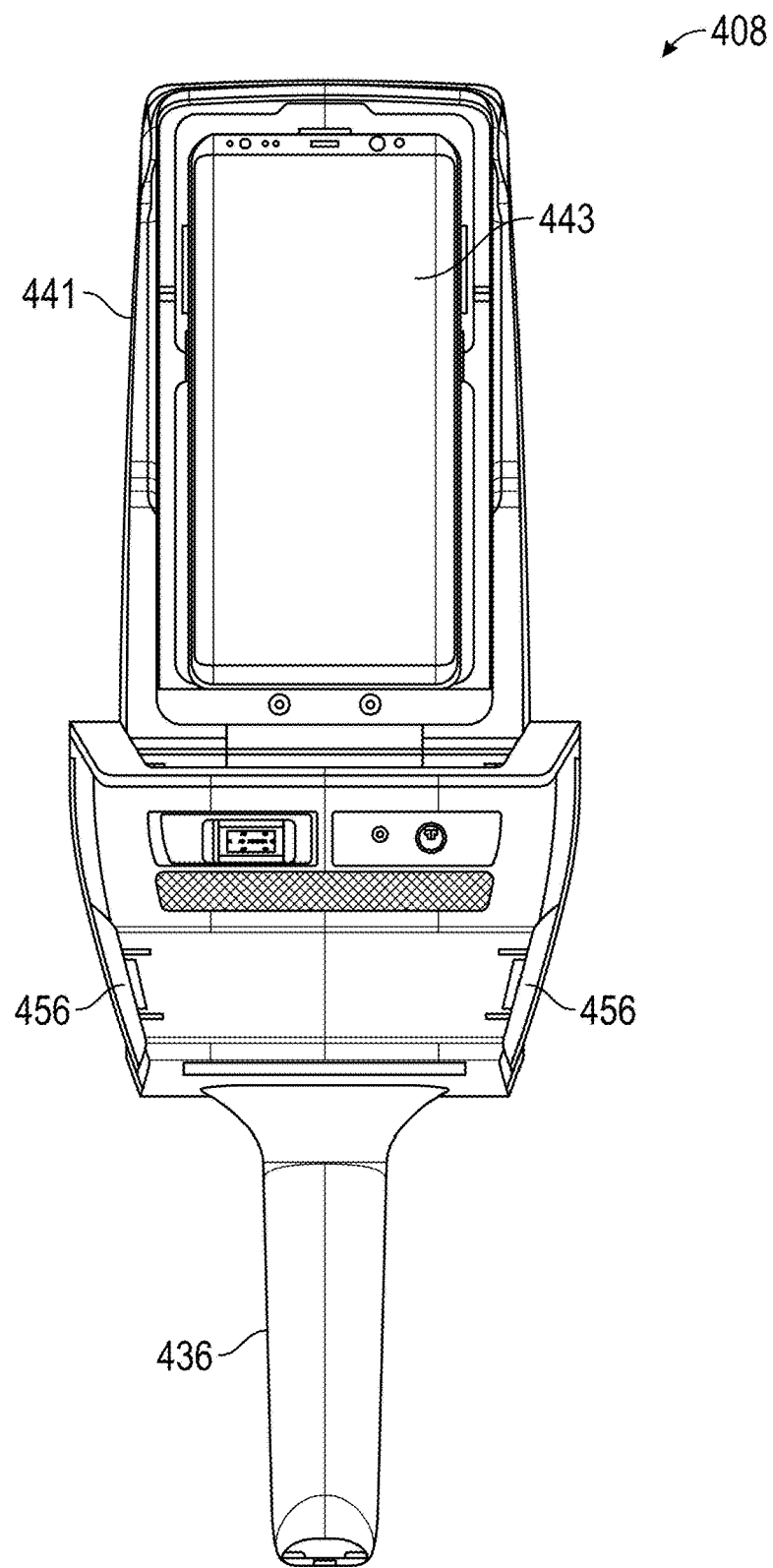
FIG. 12 is a first end view of the system of FIG. 9.

If should further be appreciated that in some embodiments, it may be desired to the measurement platform to be motorized in a semi-autonomous or fully-autonomous configuration. Referring now to FIG. 6 and FIG. 7, an embodiment is shown of a mobile scanning platform 300. The mobile scanning platform 100 includes a base unit 302 having a plurality of wheels 304. The wheels 304 are rotated by motors 305 (FIG. 8). In an embodiment, an adapter plate 307 is coupled to the base unit 302 to allow components and modules to be coupled to the base unit 302. The mobile scanning platform 300 further includes a 2D scanner 308 and a 3D scanner 310. In the illustrated embodiment, each scanner 308, 310 is removably coupled to the adapter plate 306. The 2D scanner 308 may be the scanner illustrated and described in reference to FIGS. 9-26. As will be described in more detail herein, in some embodiments the 2D scanner 308 is removable from the adapter plate 306 and is used to generate a map of the environment, plan a path for the mobile scanning platform to follow, and define 3D scanning locations. In the illustrated embodiment, the 2D scanner 308 is slidably coupled to a bracket 311 that couples the 2D scanner 308 to the adapter plate 307.

Figure 27:
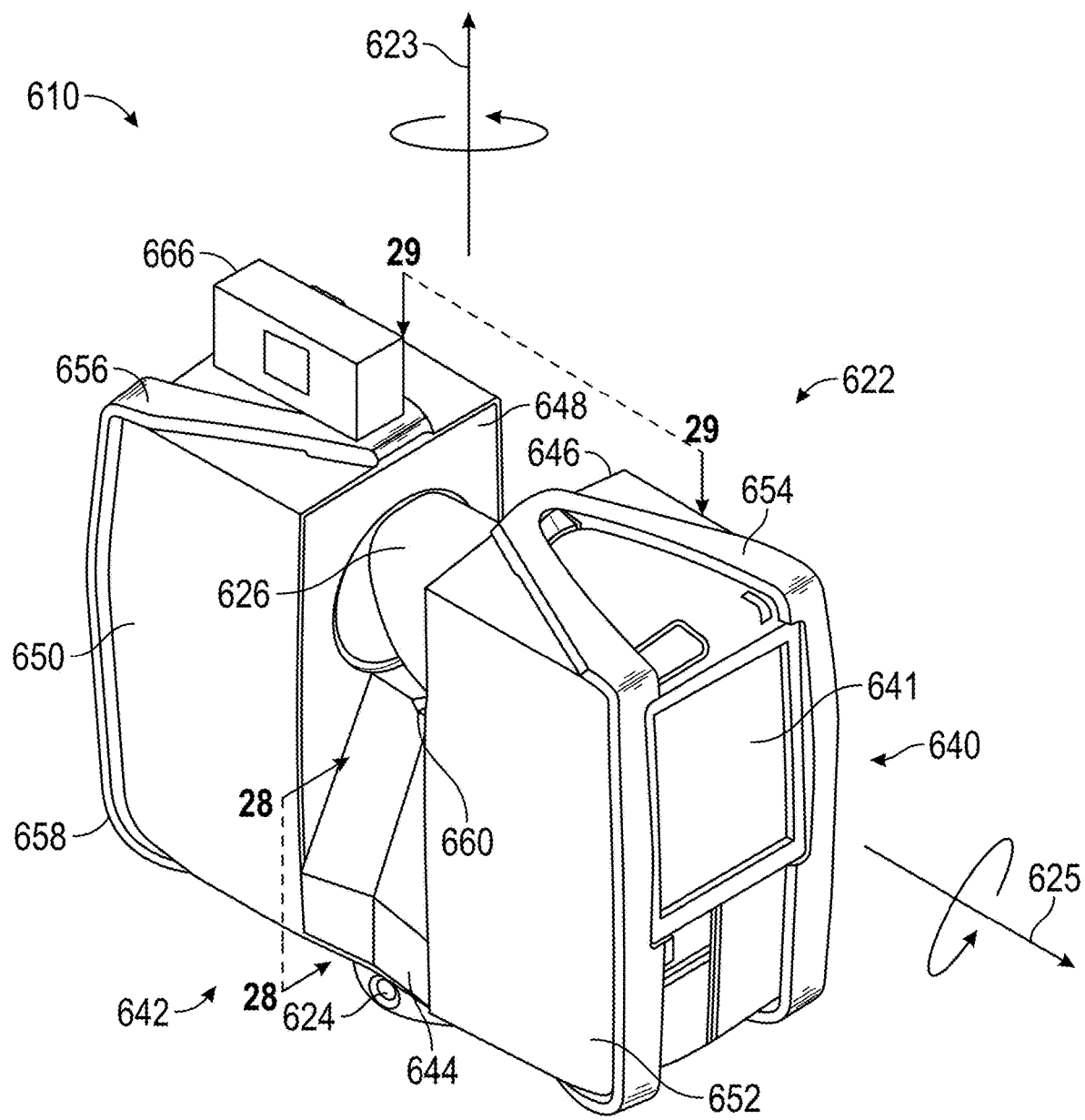
FIGS. 27-29 are views of a time-of-flight laser scanner for use with the mobile scanning platform of FIG. 1 in accordance with an embodiment.
Figure 28:
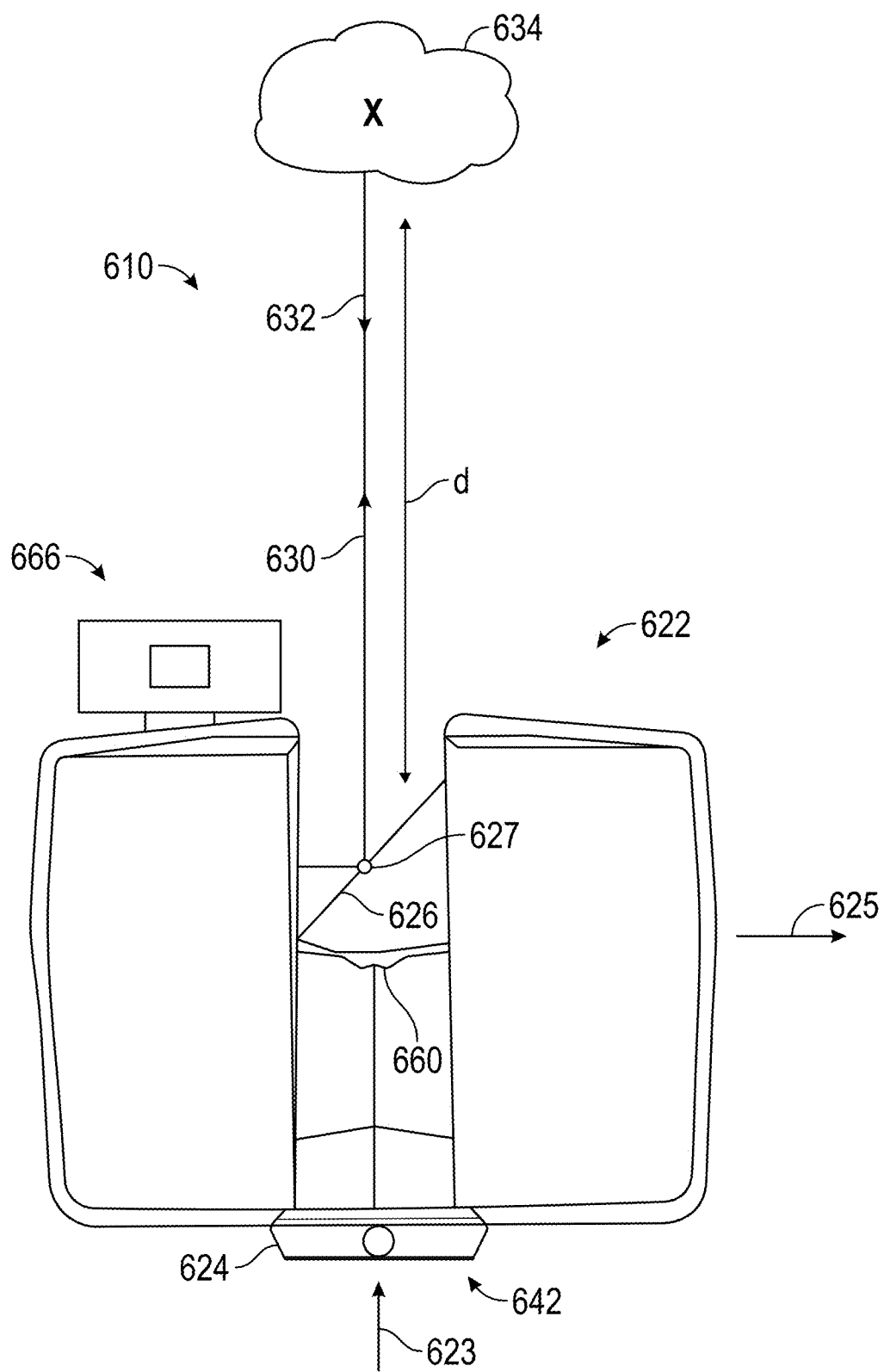
Figure 29:
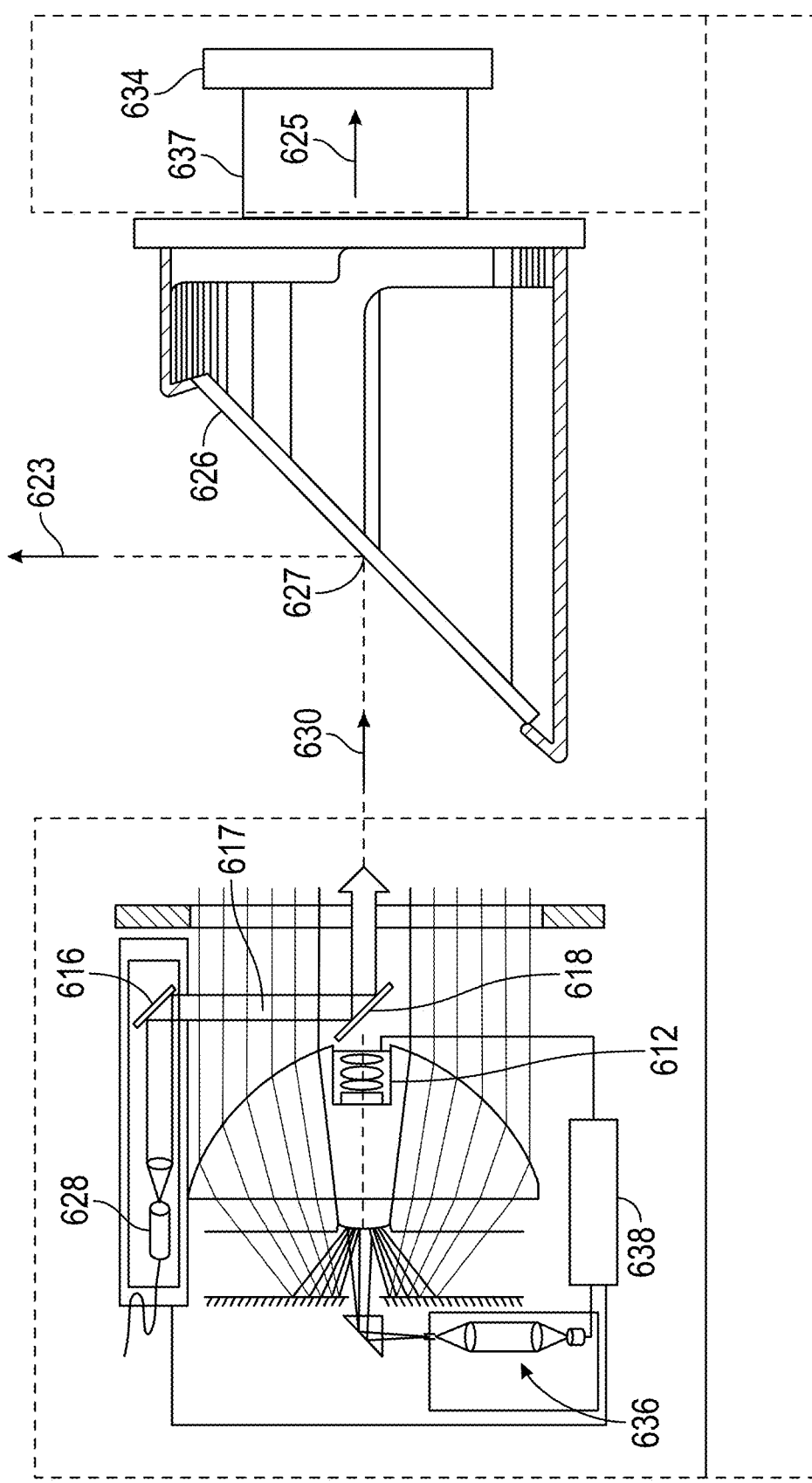

In an embodiment, the 3D scanner 310 is a time-of-flight (TOF) laser scanner such as that shown and described in reference to FIGS. 27-29. The scanner 310 may be that described in commonly owned U.S. Pat. No. 8,705,012, which is incorporated by reference herein. In an embodiment, the 3D scanner 310 mounted on a pedestal or post 309 that elevates the 3D scanner 310 above (e.g. further from the floor than) the other components in the mobile scanning platform 300 so that the emission and receipt of the light beam is not interfered with. In the illustrated embodiment, the pedestal 309 is coupled to the adapter plate 307 by a u-shaped frame 314.

In an embodiment, the mobile scanning platform 300 further includes a controller 316. The controller 316 is a computing device having one or more processors and memory. The one or more processors are responsive to non-transitory executable computer instructions for performing operational methods, such as that shown and described with respect to FIG. 30 for example. The processors may be microprocessors, field programmable gate arrays (FPGAs), digital signal processors (DSPs), and generally any device capable of performing computing functions. The one or more processors have access to memory for storing information.

Coupled for communication to the controller 316 is a communications circuit 318 and a input/output hub 320. In the illustrated embodiment, the communications circuit 318 is configured to transmit and receive data via a wireless radio-frequency communications medium, such as WiFi or Bluetooth for example. In an embodiment, the 2D scanner 308 communicates with the controller 316 via the communications circuit 318

In an embodiment, the mobile scanning platform 300 further includes a motor controller 322 that is operably coupled to the control the motors 305 (FIG. 5). In an embodiment, the motor controller 322 is mounted to an external surface of the base unit 302. In another embodiment, the motor controller 322 is arranged internally within the base unit 302. The mobile scanning platform 300 further includes a power supply 324 that controls the flow of electrical power from a power source, such as batteries 326 for example. The batteries 326 may be disposed within the interior of the base unit 302. In an embodiment, the base unit 302 includes a port (not shown) for coupling the power supply to an external power source for recharging the batteries 326. In another embodiment, the batteries 326 are removable or replaceable.

Referring now to FIGS. 9-26, an embodiment of a 2D scanner 408 is shown having a housing 432 that includes a body portion 434 and a removable handle portion 436. It should be appreciated that while the embodiment of FIGS. 9-26 illustrate the 2D scanner 408 with the handle 436 attached, the handle 436 may be removed before the 2D scanner 408 is coupled to the base unit 302 when used in the embodiment of FIGS. 6-8. In an embodiment, the handle 436 may include an actuator 438 that allows the operator to interact with the scanner 408. In the exemplary embodiment, the body 434 includes a generally rectangular center portion 435 with a slot 440 formed in an end 442. The slot 440 is at least partially defined by a pair walls 444 that are angled towards a second end 448. As will be discussed in more detail herein, a portion of a 2D laser scanner 450 is arranged between the walls 444. The walls 444 are angled to allow the 2D laser scanner 450 to operate by emitting a light over a large angular area without interference from the walls 444. As will be discussed in more detail herein, the end 442 may further include a three-dimensional camera or RGBD camera.

Figure 13:
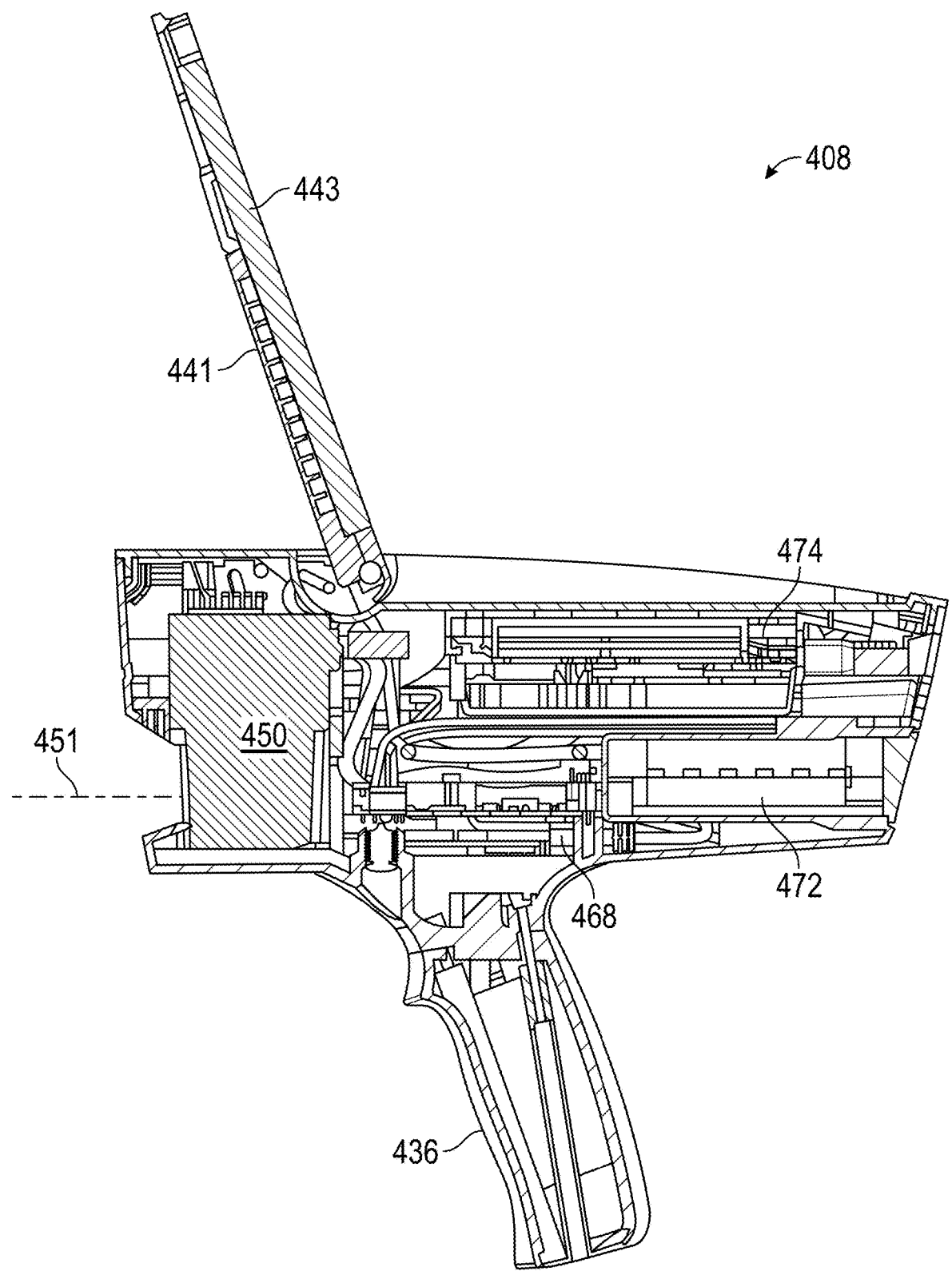
FIG. 13 is a side sectional view of the system of FIG. 9.
Figure 15:
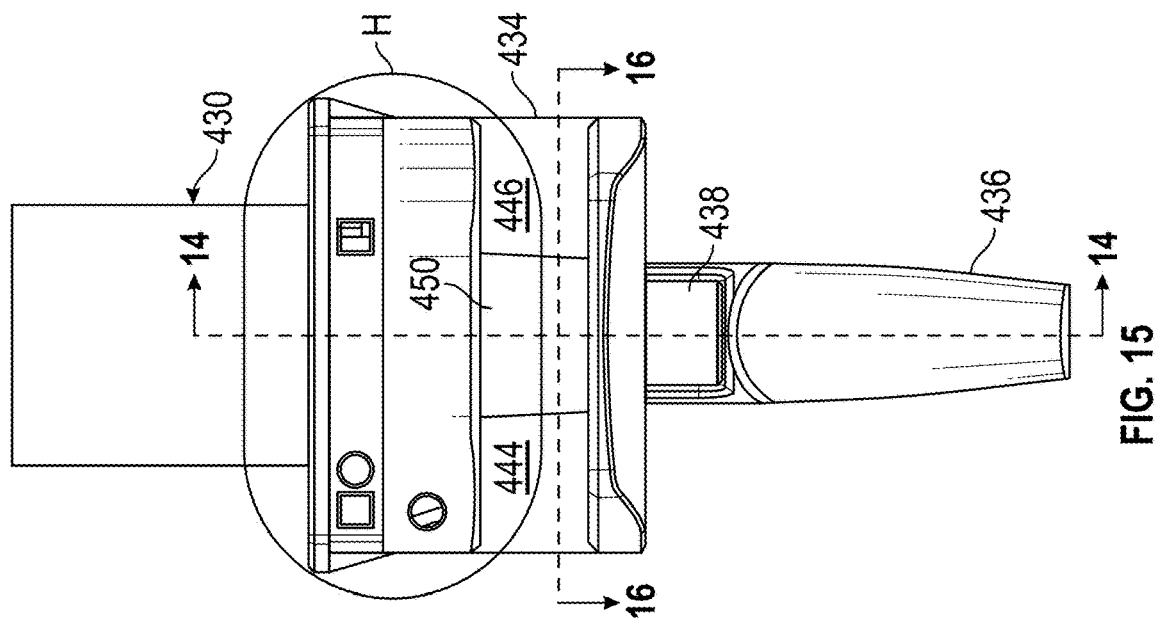
FIG. 15 is a first end view of the system of FIG. 14.
Figure 14:
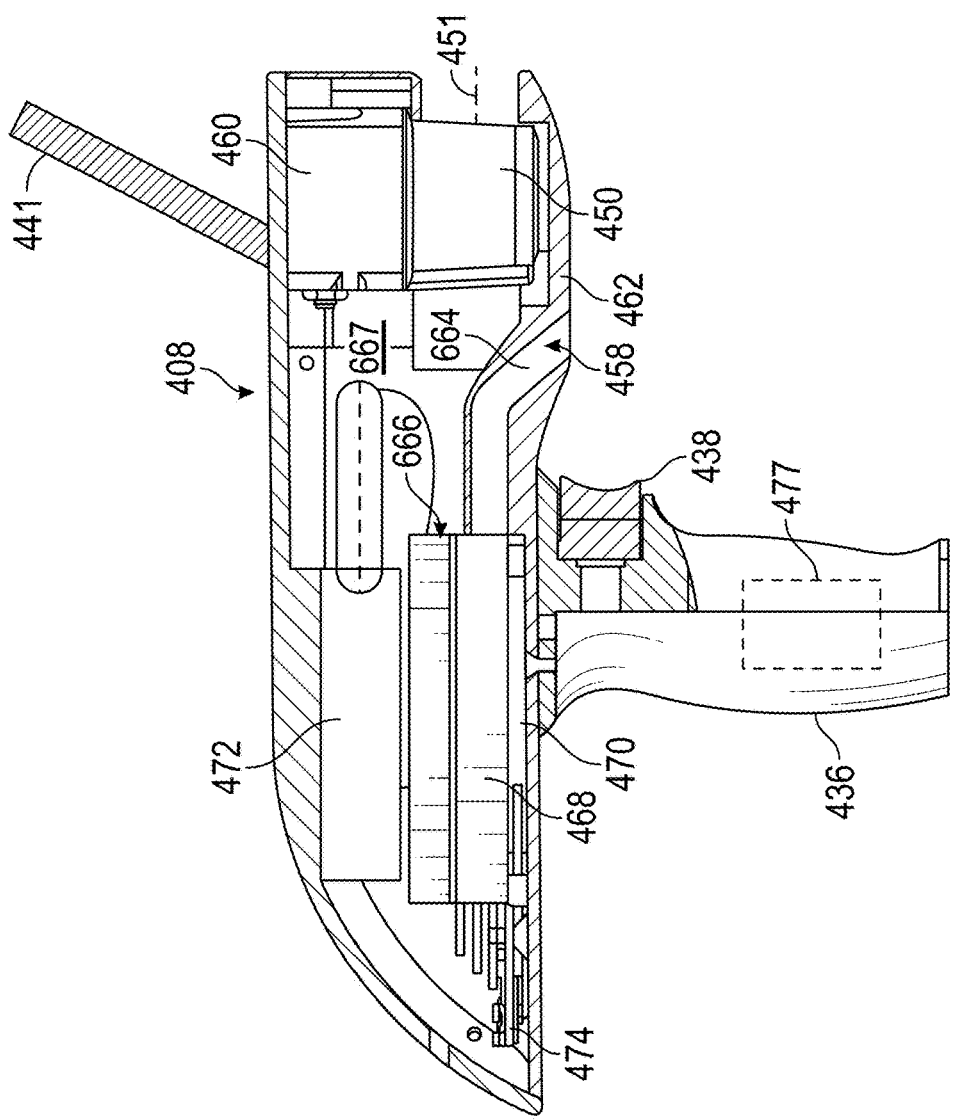
FIG. 14 is a side sectional view of the 2D system of a scanning and mapping system of FIG. 6 in accordance with another embodiment.
Figure 16:
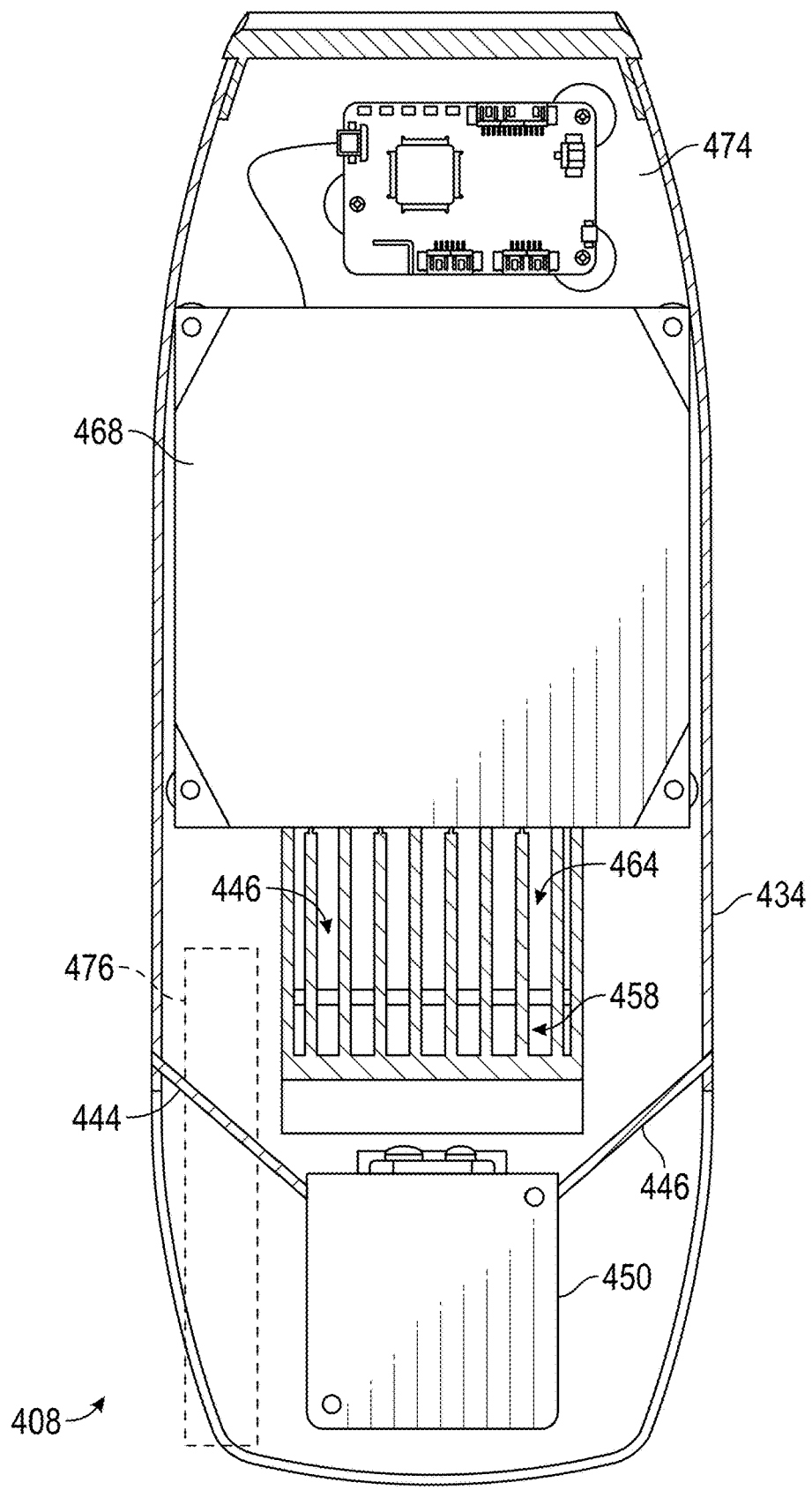
FIG. 16 is a top sectional view of the system of FIG. 14.
Figure 17:
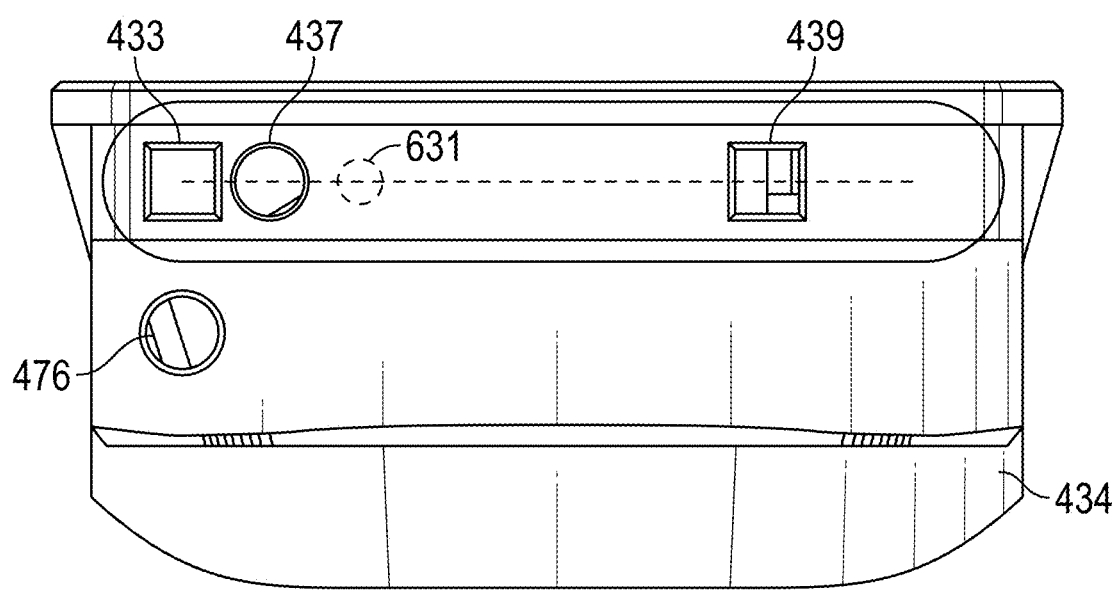
FIG. 17 is an enlarged view of a portion of the second end of FIG. 15.

Extending from the center portion 435 is a mobile device holder 441. The mobile device holder 441 is configured to securely couple a mobile device 443 to the housing 432. The holder 441 may include one or more fastening elements, such as a magnetic or mechanical latching element for example, that couples the mobile device 443 to the housing 432. In an embodiment, the mobile device 443 is coupled to communicate with a controller 468 (FIG. 13). The communication between the controller 468 and the mobile device 443 may be via any suitable communications medium, such as wired, wireless or optical communication mediums for example.

In the illustrated embodiment, the holder 441 is pivotally coupled to the housing 432, such that it may be selectively rotated into a closed position within a recess 446. In an embodiment, the recess 446 is sized and shaped to receive the holder 441 with the mobile device 443 disposed therein.

In the exemplary embodiment, the second end 448 includes a plurality of exhaust vent openings 456. In an embodiment, shown in FIGS. 14-17, the exhaust vent openings 456 are fluidly coupled to intake vent openings 458 arranged on a bottom surface 462 of center portion 435. The intake vent openings 458 allow external air to enter a conduit 464 having an opposite opening 466 in fluid communication with the hollow interior 467 of the body 434. In an embodiment, the opening 466 is arranged adjacent to a controller 468 which has one or more processors that is operable to perform the methods described herein. In an embodiment, the external air flows from the opening 466 over or around the controller 468 and out the exhaust vent openings 456.

In an embodiment, the controller 468 is coupled to a wall 470 of body 434. In an embodiment, the wall 470 is coupled to or integral with the handle 436. The controller 468 is electrically coupled to the 2D laser scanner 450, the 3D camera 460, a power source 472, an inertial measurement unit (IMU) 474, a laser line projector 476 (FIG. 13), and a haptic feedback device 477.

Figure 18:
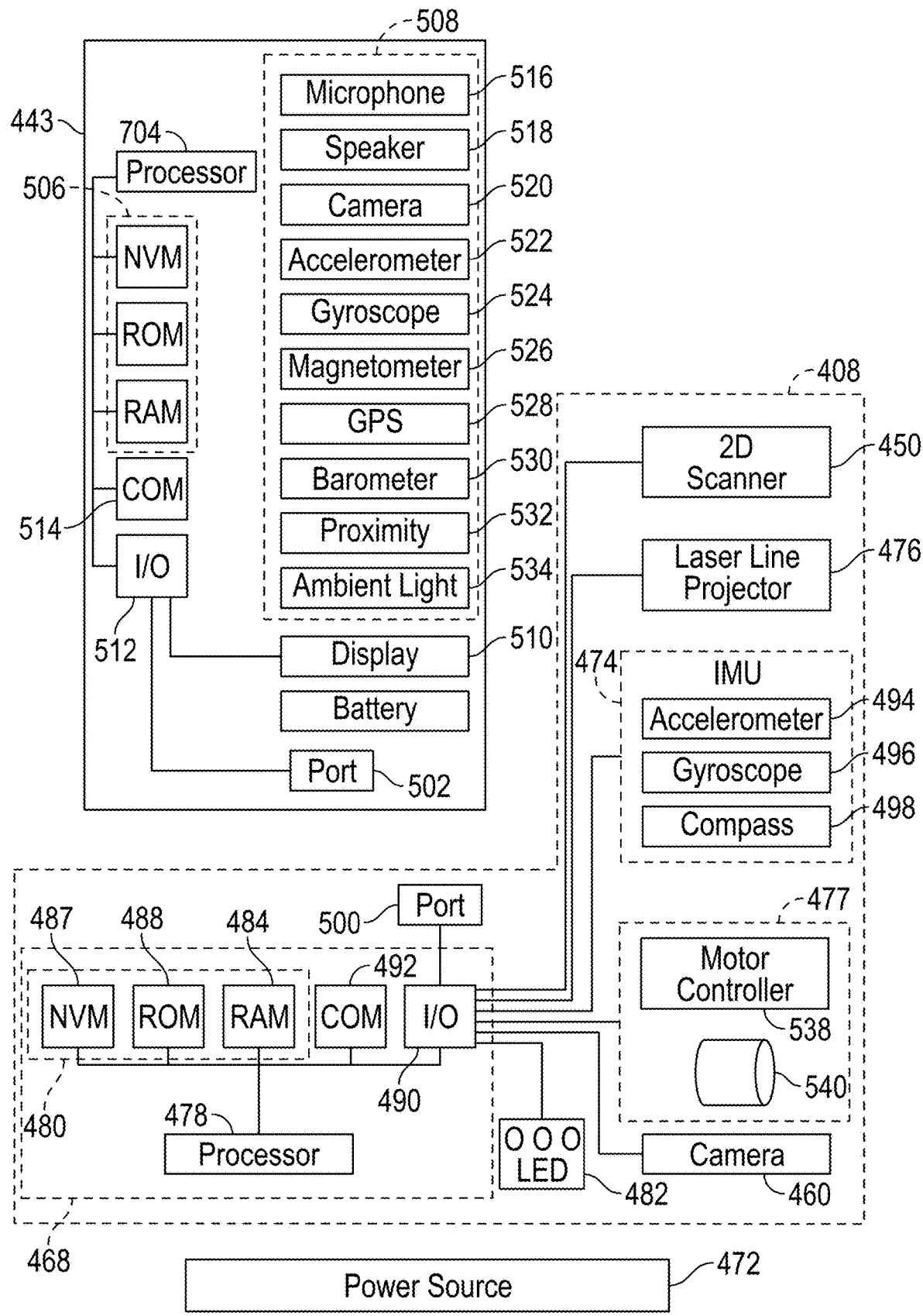
FIG. 18 is a block diagram of the system of FIG. 9 and FIG. 15.

Referring now to FIG. 18 with continuing reference to FIGS. 9-17, elements are shown of the scanner 408 with the mobile device 443 installed or coupled to the housing 432. Controller 468 is a suitable electronic device capable of accepting data and instructions, executing the instructions to process the data, and presenting the results. The controller 468 includes one or more processing elements 478. The processors may be microprocessors, field programmable gate arrays (FPGAs), digital signal processors (DSPs), and generally any device capable of performing computing functions. The one or more processors 478 have access to memory 480 for storing information.

Controller 468 is capable of converting the analog voltage or current level provided by 2D laser scanner 450, camera 460 and IMU 474 into a digital signal to determine a distance from the scanner 408 to an object in the environment. In an embodiment, the camera 460 is a 3D or RGBD type camera. Controller 468 uses the digital signals that act as input to various processes for controlling the scanner 408. The digital signals represent one or more scanner 408 data including but not limited to distance to an object, images of the environment, acceleration, pitch orientation, yaw orientation and roll orientation. As will be discussed in more detail, the digital signals may be from components internal to the housing 432 or from sensors and devices located in the mobile device 443.

In general, when the mobile device 443 is not installed, controller 468 accepts data from 2D laser scanner 450 and IMU 474 and is given certain instructions for the purpose of generating a two-dimensional map of a scanned environment. Controller 468 provides operating signals to the 2D laser scanner 450, the camera 460, laser line projector 476 and haptic feedback device 477. Controller 468 also accepts data from IMU 474, indicating, for example, whether the operator is operating in the system in the desired orientation. The controller 468 compares the operational parameters to predetermined variances (e.g. yaw, pitch or roll thresholds) and if the predetermined variance is exceeded, generates a signal that activates the haptic feedback device 477. The data received by the controller 468 may be displayed on a user interface coupled to controller 468. The user interface may be one or more LEDs (light-emitting diodes) 482, an LCD (liquid-crystal diode) display, a CRT (cathode ray tube) display, or the like. A keypad may also be coupled to the user interface for providing data input to controller 468. In one embodiment, the user interface is arranged or executed on the mobile device 443.

The controller 468 may also be coupled to external computer networks such as a local area network (LAN) and the Internet. A LAN interconnects one or more remote computers, which are configured to communicate with controllers 468 using a well-known computer communications protocol such as TCP/IP (Transmission Control Protocol/Internet(ˆ) Protocol), RS-232, ModBus, and the like. additional scanners 408 may also be connected to LAN with the controllers 468 in each of these scanners 408 being configured to send and receive data to and from remote computers and other scanners 408. The LAN may be connected to the Internet. This connection allows controller 468 to communicate with one or more remote computers connected to the Internet.

The processors 478 are coupled to memory 480. The memory 480 may include random access memory (RAM) device 484, a non-volatile memory (NVM) device 486, a read-only memory (ROM) device 488. In addition, the processors 478 may be connected to one or more input/output (I/O) controllers 490 and a communications circuit 492. In an embodiment, the communications circuit 492 provides an interface that allows wireless or wired communication with one or more external devices or networks, such as the LAN discussed above or the communications circuit 418.

Controller 468 includes operation control methods embodied in application code such as that shown or described with reference to FIGS. 19-22. These methods are embodied in computer instructions written to be executed by processors 478, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 468 is the 2D laser scanner 450. The 2D laser scanner 450 measures 2D coordinates in a plane. In the exemplary embodiment, the scanning is performed by steering light within a plane to illuminate object points in the environment. The 2D laser scanner 450 collects the reflected (scattered) light from the object points to determine 2D coordinates of the object points in the 2D plane. In an embodiment, the 2D laser scanner 450 scans a spot of light over an angle while at the same time measuring an angle value and corresponding distance value to each of the illuminated object points.

Examples of 2D laser scanners 450 include, but are not limited to Model LMS100 scanners manufactured by Sick, Inc of Minneapolis, Minn. and scanner Models URG-04LX-UG01 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D laser scanner 450 is oriented so as to scan a beam of light over a range of angles in a generally horizontal plane (relative to the floor of the environment being scanned). At instants in time the 2D laser scanner 450 returns an angle reading and a corresponding distance reading to provide 2D coordinates of object points in the horizontal plane. In completing one scan over the full range of angles, the 2D laser scanner returns a collection of paired angle and distance readings. As the platform 100, 200, 300 is moved from place to place, the 2D laser scanner 450 continues to return 2D coordinate values. These 2D coordinate values are used to locate the position of the scanner 408 thereby enabling the generation of a two-dimensional map or floorplan of the environment.

Also coupled to the controller 486 is the IMU 474. The IMU 474 is a position/orientation sensor that may include accelerometers 494 (inclinometers), gyroscopes 496, a magnetometers or compass 498, and altimeters. In the exemplary embodiment, the IMU 474 includes multiple accelerometers 494 and gyroscopes 496. The compass 498 indicates a heading based on changes in magnetic field direction relative to the earth's magnetic north. The IMU 474 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 474 determines the pose or orientation of the scanner 108 about three-axis to allow a determination of a yaw, roll and pitch parameter.

In the embodiment shown in FIGS. 14-17, the scanner 408 further includes a camera 460 that is a 3D or RGB-D camera. As used herein, the term 3D camera refers to a device that produces a two-dimensional image that includes distances to a point in the environment from the location of scanner 408. The 3D camera 460 may be a range camera or a stereo camera. In an embodiment, the 3D camera 460 includes an RGB-D sensor that combines color information with a per-pixel depth information. In an embodiment, the 3D camera 460 may include an infrared laser projector 431 (FIG. 17), a left infrared camera 433, a right infrared camera 439, and a color camera 437. In an embodiment, the 3D camera 460 is a RealSense™ camera model R200 manufactured by Intel Corporation.

In an embodiment, when the mobile device 443 is coupled to the housing 432, the mobile device 443 becomes an integral part of the scanner 408. In an embodiment, the mobile device 443 is a cellular phone, a tablet computer or a personal digital assistant (PDA). The mobile device 443 may be coupled for communication via a wired connection, such as ports 500, 502. The port 500 is coupled for communication to the processor 478, such as via I/O controller 690 for example. The ports 500, 502 may be any suitable port, such as but not limited to USB, USB-A, USB-B, USB-C, IEEE 1394 (Firewire), or Lightning™ connectors.

The mobile device 443 is a suitable electronic device capable of accepting data and instructions, executing the instructions to process the data, and presenting the results. The mobile device 443 includes one or more processing elements 504. The processors may be microprocessors, field programmable gate arrays (FPGAs), digital signal processors (DSPs), and generally any device capable of performing computing functions. The one or more processors 504 have access to memory 506 for storing information.

The mobile device 443 is capable of converting the analog voltage or current level provided by sensors 508 and processor 478. Mobile device 443 uses the digital signals that act as input to various processes for controlling the scanner 408. The digital signals represent one or more platform 100, 200, 300 data including but not limited to distance to an object, images of the environment, acceleration, pitch orientation, yaw orientation, roll orientation, global position, ambient light levels, and altitude for example.

In general, mobile device 443 accepts data from sensors 508 and is given certain instructions for the purpose of generating or assisting the processor 478 in the generation of a two-dimensional map or three-dimensional map of a scanned environment. Mobile device 443 provides operating signals to the processor 478, the sensors 508 and a display 510. Mobile device 443 also accepts data from sensors 508, indicating, for example, to track the position of the mobile device 443 in the environment or measure coordinates of points on surfaces in the environment. The mobile device 443 compares the operational parameters to predetermined variances (e.g. yaw, pitch or roll thresholds) and if the predetermined variance is exceeded, may generate a signal. The data received by the mobile device 443 may be displayed on display 510. In an embodiment, the display 510 is a touch screen device that allows the operator to input data or control the operation of the scanner 408.

The controller 468 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, and the like. additional scanners 408 may also be connected to LAN with the controllers 468 in each of these scanners 408 being configured to send and receive data to and from remote computers and other scanners 408. The LAN may be connected to the Internet. This connection allows controller 468 to communicate with one or more remote computers connected to the Internet.

The processors 504 are coupled to memory 506. The memory 506 may include random access memory (RAM) device, a non-volatile memory (NVM) device, and a read-only memory (ROM) device. In addition, the processors 504 may be connected to one or more input/output (I/O) controllers 512 and a communications circuit 514. In an embodiment, the communications circuit 514 provides an interface that allows wireless or wired communication with one or more external devices or networks, such as the LAN or the cellular network discussed above.

Controller 468 includes operation control methods embodied in application code shown or described with reference to FIGS. 19-22. These methods are embodied in computer instructions written to be executed by processors 478, 504, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Also coupled to the processor 504 are the sensors 508. The sensors 508 may include but are not limited to: a microphone 516; a speaker 518; a front or rear facing camera 520; accelerometers 522 (inclinometers), gyroscopes 524, a magnetometers or compass 526; a global positioning satellite (GPS) module 528; a barometer 530; a proximity sensor 532; and an ambient light sensor 534. By combining readings from a combination of sensors 508 with a fusion algorithm that may include a Kalman filter, relatively accurate position and orientation measurements can be obtained.

It should be appreciated that the sensors 460, 474 integrated into the scanner 408 may have different characteristics than the sensors 508 of mobile device 443. For example, the resolution of the cameras 460, 520 may be different, or the accelerometers 494, 522 may have different dynamic ranges, frequency response, sensitivity (mV/g) or temperature parameters (sensitivity or range). Similarly, the gyroscopes 496, 524 or compass/magnetometer may have different characteristics. It is anticipated that in some embodiments, one or more sensors 508 in the mobile device 443 may be of higher accuracy than the corresponding sensors 474 in the scanner 408. As described in more detail herein, in some embodiments the processor 478 determines the characteristics of each of the sensors 508 and compares them with the corresponding sensors in the scanner 408 when the mobile device. The processor 478 then selects which sensors 474, 508 are used during operation. In some embodiments, the mobile device 443 may have additional sensors (e.g. microphone 516, camera 520) that may be used to enhance operation compared to operation of the scanner 408 without the mobile device 443. In still further embodiments, the scanner 408 does not include the IMU 474 and the processor 478 uses the sensors 508 for tracking the position and orientation/pose of the scanner 408. In still further embodiments, the addition of the mobile device 443 allows the scanner 408 to utilize the camera 520 to perform three-dimensional (3D) measurements either directly (using an RGB-D camera) or using photogrammetry techniques to generate 3D maps. In an embodiment, the processor 478 uses the communications circuit (e.g. a cellular 4G internet connection) to transmit and receive data from remote computers or devices.

In an embodiment, the scanner 408 determines a quality attribute/parameter for the tracking of the scanner 408 and/or the platform 100. In an embodiment, the tracking quality attribute is a confidence level in the determined tracking positions and orientations to actual positions and orientations. When the confidence level crosses a threshold, the platform 100 may provide feedback to the operator to perform a stationary scan. It should be appreciated that a stationary scan will provide a highly accurate measurements that will allow the determination of the position and orientation of the scanner or platform with a high level of confidence. In an embodiment, the feedback is provided via a user interface. The user interface may be on the platform 100, the scanner 408, or the scanner 610 for example.

In the exemplary embodiment, the scanner 408 is a handheld portable device that is sized and weighted to be carried by a single person during operation. Therefore, the plane 536 (FIG. 22) in which the 2D laser scanner 450 projects a light beam may not be horizontal relative to the floor or may continuously change as the computer moves during the scanning process. Thus, the signals generated by the accelerometers 494, gyroscopes 496 and compass 498 (or the corresponding sensors 508) may be used to determine the pose (yaw, roll, tilt) of the scanner 108 and determine the orientation of the plane 451.

In an embodiment, it may be desired to maintain the pose of the scanner 408 (and thus the plane 536) within predetermined thresholds relative to the yaw, roll and pitch orientations of the scanner 408. In an embodiment, a haptic feedback device 477 is disposed within the housing 432, such as in the handle 436. The haptic feedback device 477 is a device that creates a force, vibration or motion that is felt or heard by the operator. The haptic feedback device 477 may be, but is not limited to: an eccentric rotating mass vibration motor or a linear resonant actuator for example.

The haptic feedback device is used to alert the operator that the orientation of the light beam from 2D laser scanner 450 is equal to or beyond a predetermined threshold. In operation, when the IMU 474 measures an angle (yaw, roll, pitch or a combination thereof), the controller 468 transmits a signal to a motor controller 538 that activates a vibration motor 540. Since the vibration originates in the handle 436, the operator will be notified of the deviation in the orientation of the scanner 408. The vibration continues until the scanner 408 is oriented within the predetermined threshold or the operator releases the actuator 438. In an embodiment, it is desired for the plane 536 to be within 10-15 degrees of horizontal (relative to the ground) about the yaw, roll and pitch axes.

Figure 19:
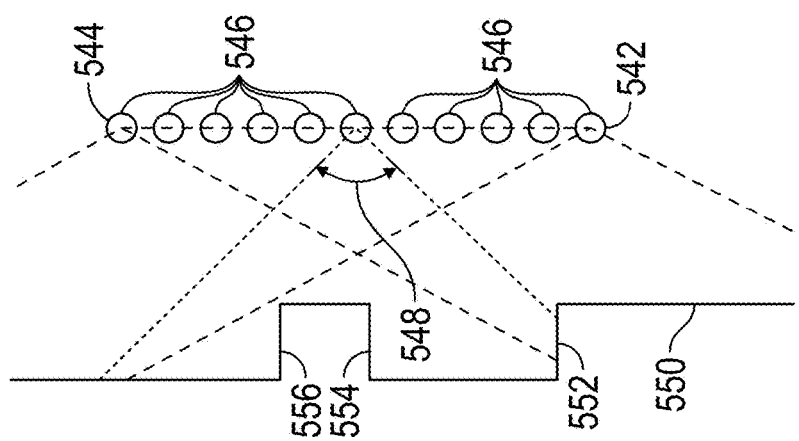

In an embodiment, the 2D laser scanner 450 makes measurements as the platform 100, 200, 300 is moved about an environment, such from a first position 542 to a second registration position 544 as shown in FIG. 19. In an embodiment, 2D scan data is collected and processed as the scanner 408 passes through a plurality of 2D measuring positions 546. At each measuring position 546, the 2D laser scanner 450 collects 2D coordinate data over an effective FOV 548. Using methods described in more detail below, the controller 468 uses 2D scan data from the plurality of 2D scans at positions 546 to determine a position and orientation of the scanner 408 as it is moved about the environment. In an embodiment, the common coordinate system is represented by 2D Cartesian coordinates x, y and by an angle of rotation θ relative to the x or y axis. In an embodiment, the x and y axes lie in the plane of the 2D scanner and may be further based on a direction of a "front" of the 2D laser scanner 450.

Figure 20:
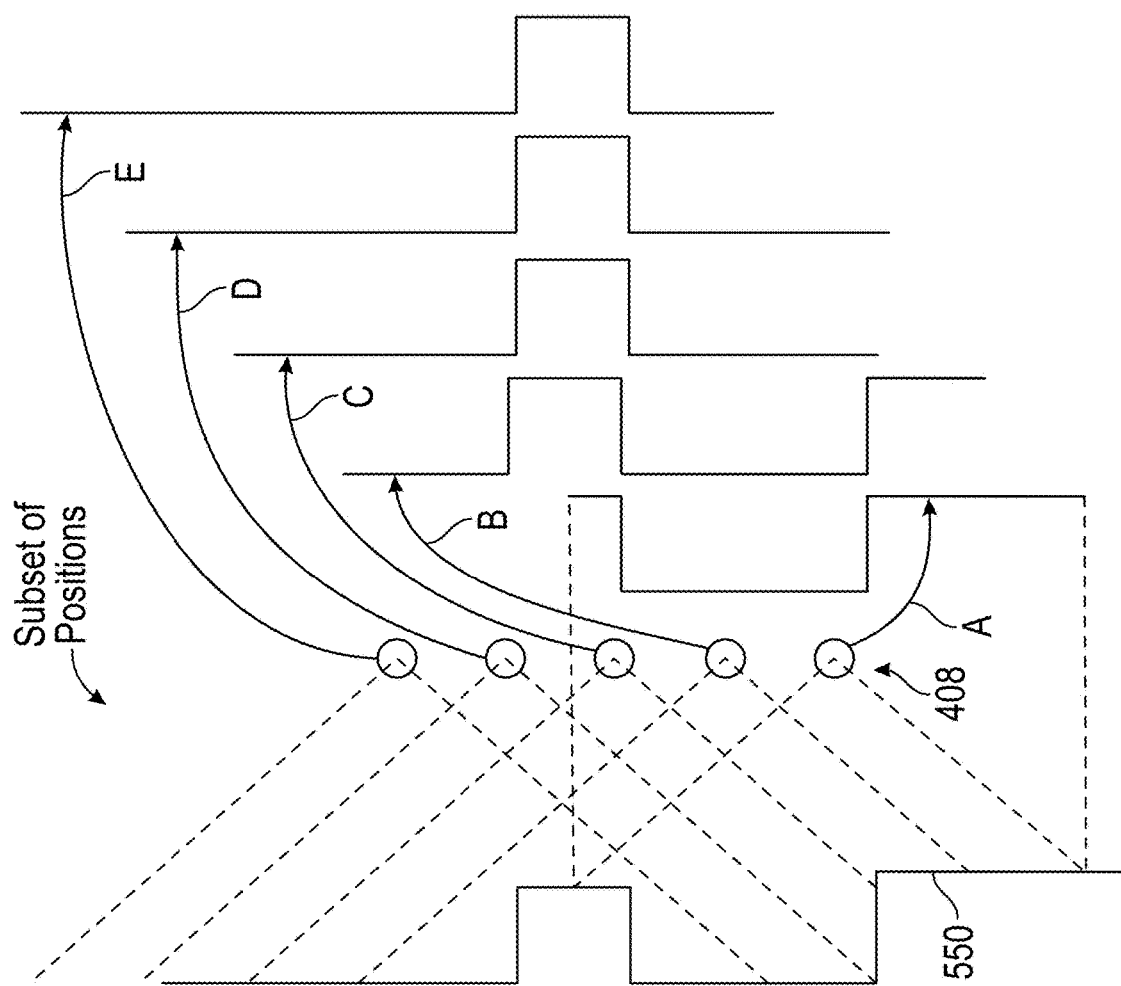
FIG. 19-21 are schematic illustrations of the operation of system of FIG. 9 in accordance with an embodiment.
Figure 21:
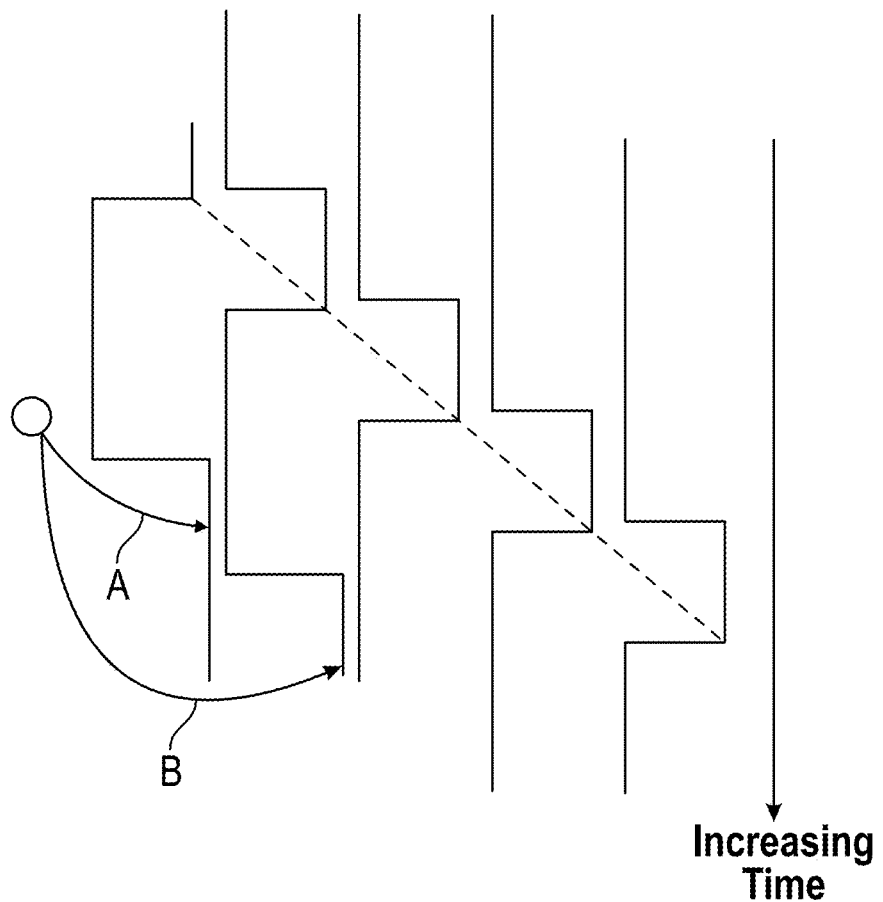

FIG. 21 shows the 2D scanner 408 collecting 2D scan data at selected positions 546 over an effective FOV 548. At different positions 546, the 2D laser scanner 450 captures a portion of the object 550 marked A, B, C, D, and E (FIG. 20). FIG. 21 shows 2D laser scanner 450 moving in time relative to a fixed frame of reference of the object 550.

FIG. 21 includes the same information as FIG. 20 but shows it from the frame of reference of the scanner 408 rather than the frame of reference of the object 550. FIG. 21 illustrates that in the scanner 408 frame of reference, the position of features on the object change over time. Therefore, the distance traveled by the scanner 408 can be determined from the 2D scan data sent from the 2D laser scanner 450 to the controller 468.

As the 2D laser scanner 450 takes successive 2D readings and performs best-fit calculations, the controller 468 keeps track of the translation and rotation of the 2D laser scanner 450, which is the same as the translation and rotation of the scanner 408. In this way, the controller 468 is able to accurately determine the change in the values of x, y, θ as the scanner 408 moves from the first position 542 to the second position 544.

In an embodiment, the controller 468 is configured to determine a first translation value, a second translation value, along with first and second rotation values (yaw, roll, pitch) that, when applied to a combination of the first 2D scan data and second 2D scan data, results in transformed first 2D data that closely matches transformed second 2D data according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. An example of an "objective mathematical criterion" is that of minimizing the sum of squared residual errors for those portions of the scan data determined to overlap. Another type of objective mathematical criterion may involve a matching of multiple features identified on the object. For example, such features might be the edge transitions 552, 554, and 556 shown in FIG. 19. The mathematical criterion may involve processing of the raw data provided by the 2D laser scanner 450 to the controller 468, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008, which is incorporated by reference herein.

In an embodiment, assuming that the plane 536 of the light beam from 2D laser scanner 450 remains horizontal relative to the ground plane, the first translation value is dx, the second translation value is dy, and the first rotation value dθ. If the first scan data is collected with the 2D laser scanner 450 having translational and rotational coordinates (in a reference coordinate system) of $(x_1, y_1, \theta_1)$, then when the second 2D scan data is collected at a second location the coordinates are given by $(x_2, y_2, \theta_2)=(x_1+dx, y_1+dy, \theta_1+d\theta)$. In an embodiment, the controller 468 is further configured to determine a third translation value (for example, dz) and a second and third rotation values (for example, pitch and roll). The third translation value, second rotation value, and third rotation value may be determined based at least in part on readings from the IMU 474.

The 2D laser scanner 450 collects 2D scan data starting at the first position 542 and more 2D scan data at the second position 544. In some cases, these scans may suffice to determine the position and orientation of the scanner 408 at the second position 544 relative to the first position 542. In other cases, the two sets of 2D scan data are not sufficient to enable the controller 468 to accurately determine the first translation value, the second translation value, and the first rotation value. This problem may be avoided by collecting 2D scan data at intermediate scan positions 546. In an embodiment, the 2D scan data is collected and processed at regular intervals, for example, once per second. In this way, features in the environment are identified in successive 2D scans at positions 546. In an embodiment, when more than two 2D scans are obtained, the controller 468 may use the information from all the successive 2D scans in determining the translation and rotation values in moving from the first position 542 to the second position 544. In another embodiment, only the first and last scans in the final calculation, simply using the intermediate 2D scans to ensure proper correspondence of matching features. In most cases, accuracy of matching is improved by incorporating information from multiple successive 2D scans.

It should be appreciated that as the scanner 408 is moved beyond the second position 544, a two-dimensional image or map of the environment being scanned may be generated. It should further be appreciated that in addition to generating a 2D map of the environment, the data from scanner 408 may be used to generate (and store) a 2D trajectory of the scanner 408 as it is moved through the environment. In an embodiment, the 2D map and/or the 2D trajectory may be combined or fused with data from other sources in the registration of measured 3D coordinates. It should be appreciated that the 2D trajectory may represent a path followed by the 2D scanner 408.

Figure 22:
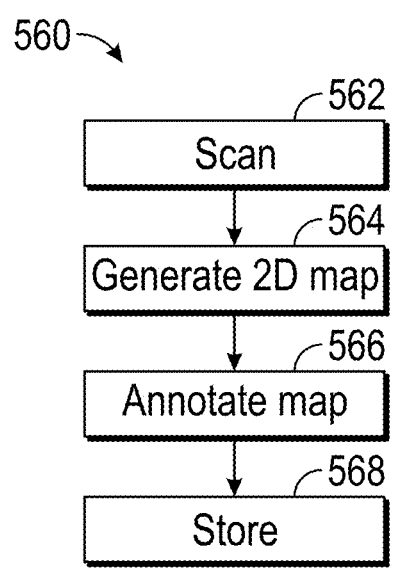
FIG. 22 is a flow diagram of a method of generating a two-dimensional map of an environment.
Figure 23:
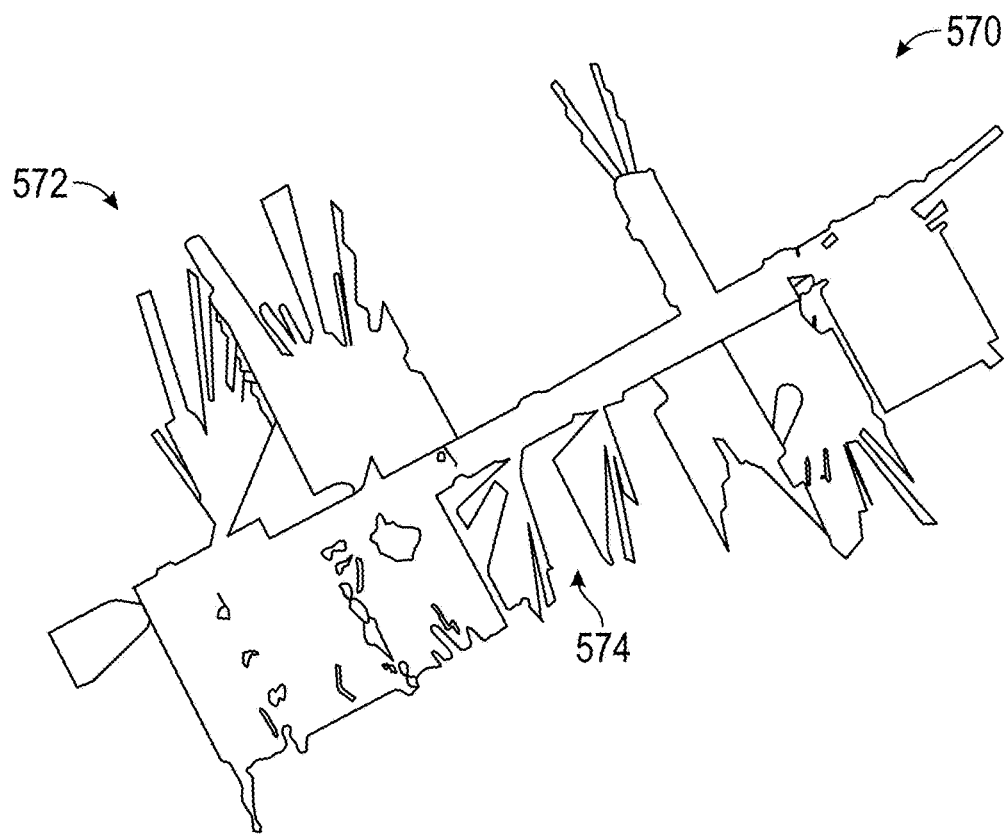
FIGS. 23-24 are plan views of stages of a two-dimensional map generated with the method of FIG. 22 in accordance with an embodiment.
Figure 24:
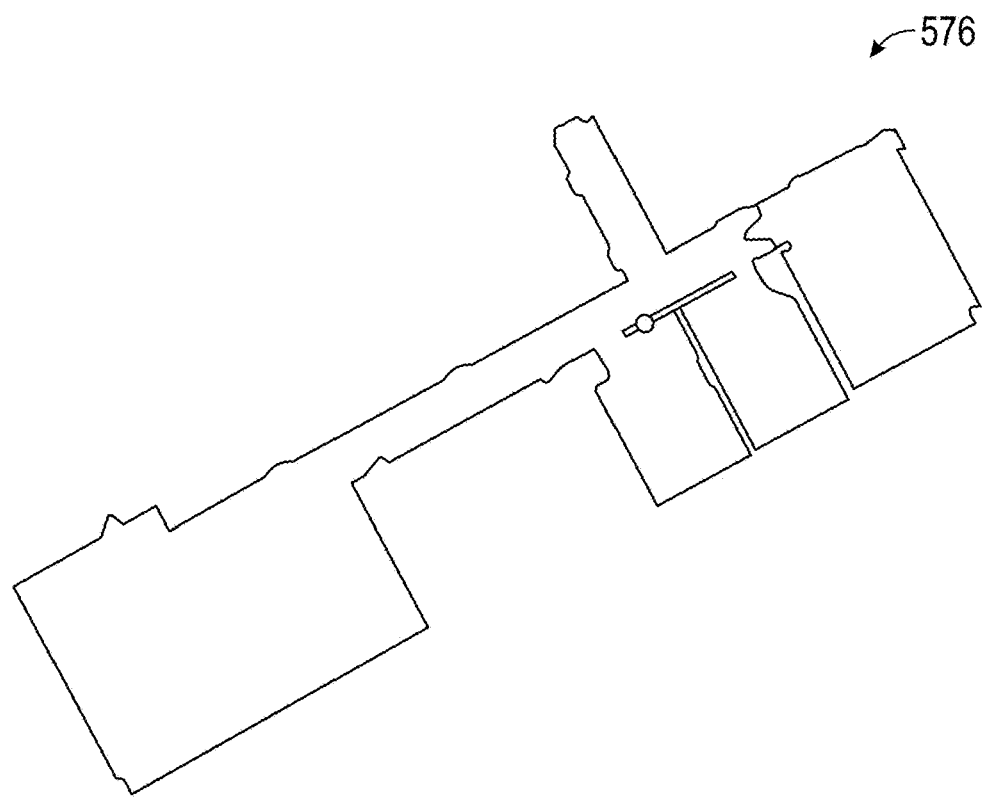

Referring now to FIG. 22, a method 560 is shown for generating a two-dimensional map with annotations. The method 560 starts in block 562 where the facility or area is scanned to acquire scan data 570, such as that shown in FIG. 23. The scanning is performed by carrying the scanner 408 through the area to be scanned. The scanner 408 measures distances from the scanner 408 to an object, such as a wall for example, and also a pose of the scanner 408 in an embodiment the user interacts with the scanner 408 via actuator 538. In the illustrated embodiments, the mobile device 443 provides a user interface that allows the operator to initiate the functions and control methods described herein. Using the registration process desired herein, the two dimensional locations of the measured points on the scanned objects (e.g. walls, doors, windows, cubicles, file cabinets etc.) may be determined. It is noted that the initial scan data may include artifacts, such as data that extends through a window 572 or an open door 574 for example. Therefore, the scan data 570 may include additional information that is not desired in a 2D map or layout of the scanned area.

The method 560 then proceeds to block 564 where a 2D map 576 is generated of the scanned area as shown in FIG. 2241. The generated 2D map 576 represents a scan of the area, such as in the form of a floor plan without the artifacts of the initial scan data. It should be appreciated that the 2D map 576 represents a dimensionally accurate representation of the scanned area that may be used to determine the position and pose of the mobile scanning platform 100, 200, 300 in the environment to allow the registration of the 3D coordinate points measured by the 3D measurement device 110. In the embodiment of FIG. 22, the method 560 then proceeds to block 566 where optional user-defined annotations are made to the 2D maps 576 to define an annotated 2D map that includes information, such as dimensions of features, the location of doors, the relative positions of objects (e.g. liquid oxygen tanks, entrances/exits or egresses or other notable features such as but not limited to the location of automated sprinkler systems, knox or key boxes, or fire department connection points ("FDC"). In an embodiment, the annotation may also be used to define scan locations where the mobile scanning platform 300 stops and uses the 3D scanner 310 to perform a stationary scan of the environment.

Once the annotations of the 2D annotated map are completed, the method 560 then proceeds to block 568 where the 2D map is stored in memory, such as nonvolatile memory 487 for example. The 2D map may also be stored in a network accessible storage device or server so that it may be accessed by the desired personnel.

Figure 25:
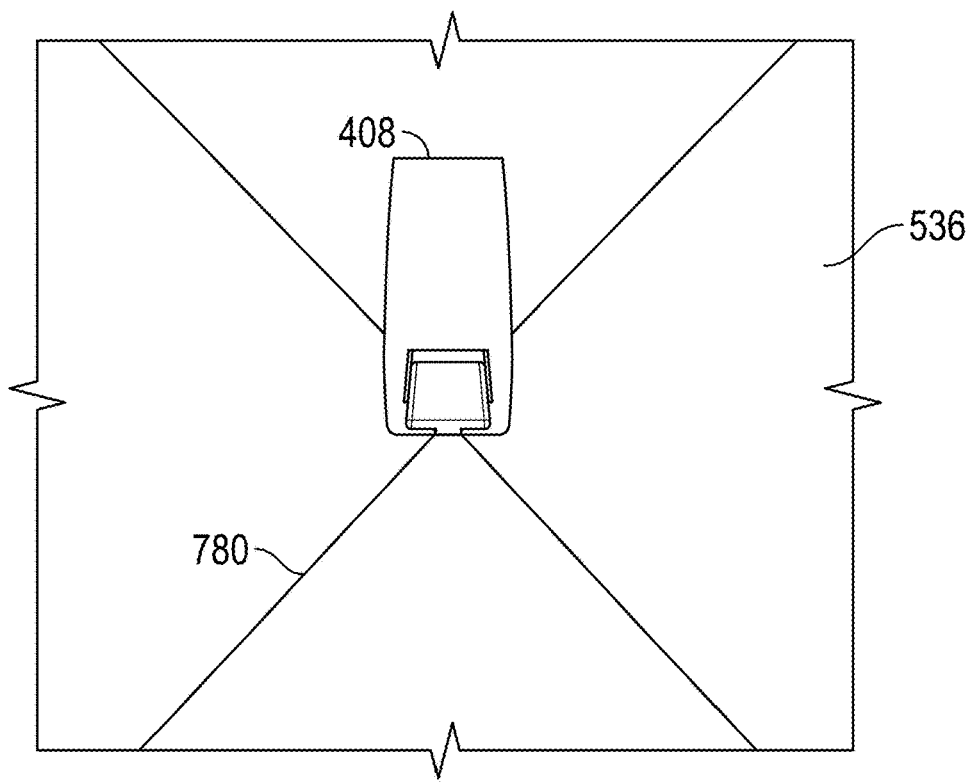
FIG. 25-26 are schematic views of the operation of the system of FIG. 9 in accordance with an embodiment.
Figure 26:
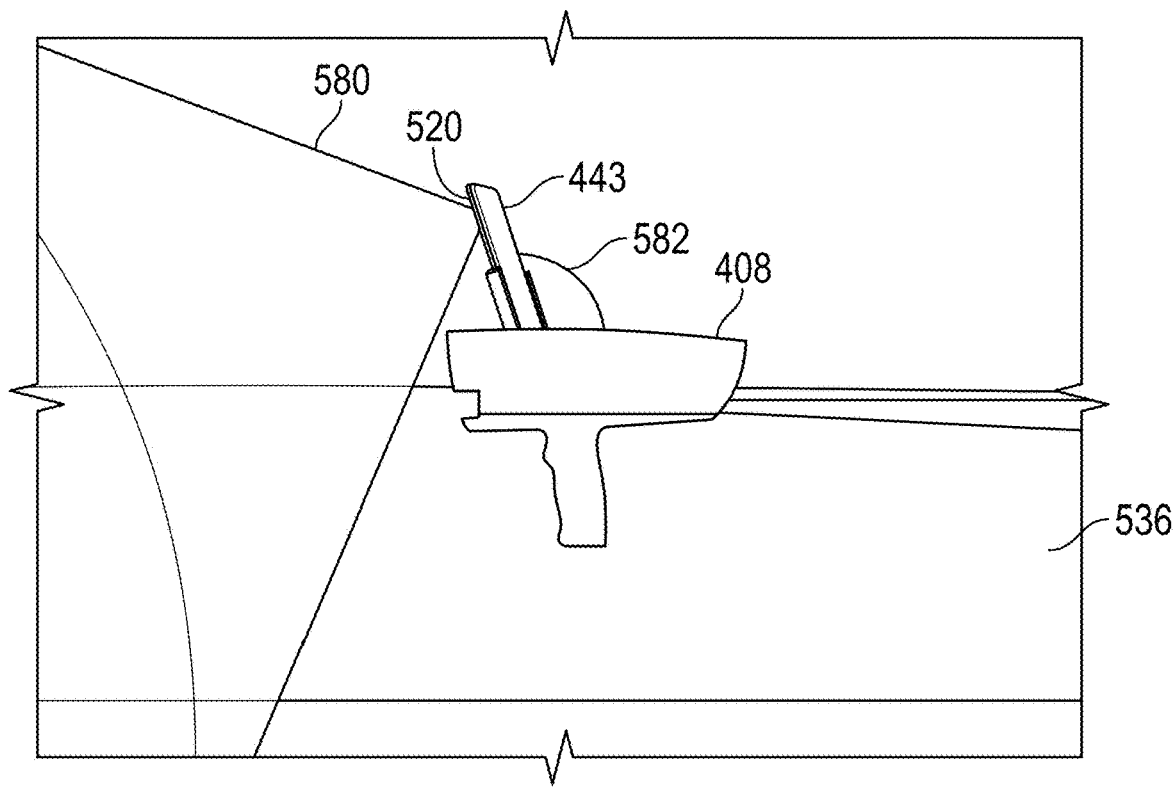

Referring now to FIG. 25 and FIG. 26 an embodiment is illustrated with the mobile device 443 coupled to the scanner 408. As described herein, the 2D laser scanner 450 emits a beam of light in the plane 536. The 2D laser scanner 450 has a field of view (FOV) that extends over an angle that is less than 360 degrees. In the exemplary embodiment, the FOV of the 2D laser scanner is about 270 degrees. In this embodiment, the mobile device 443 is coupled to the housing 432 adjacent the end where the 2D laser scanner 450 is arranged. The mobile device 443 includes a forward facing camera 520. The camera 520 is positioned adjacent a top side of the mobile device and has a predetermined field of view 580. In the illustrated embodiment, the holder 441 couples the mobile device 443 on an obtuse angle 582. This arrangement allows the mobile device 443 to acquire images of the floor and the area directly in front of the scanner 408 (e.g. the direction the operator is moving the platform 100, 200).

In embodiments where the camera 520 is a RGB-D type camera, three-dimensional coordinates of surfaces in the environment may be directly determined in a mobile device coordinate frame of reference. In an embodiment, the holder 441 allows for the mounting of the mobile device 443 in a stable position (e.g. no relative movement) relative to the 2D laser scanner 450. When the mobile device 443 is coupled to the housing 432, the processor 478 performs a calibration of the mobile device 443 allowing for a fusion of the data from sensors 508 with the sensors of scanner 408. As a result, the coordinates of the 2D laser scanner may be transformed into the mobile device coordinate frame of reference or the 3D coordinates acquired by camera 520 may be transformed into the 2D scanner coordinate frame of reference.

In an embodiment, the mobile device is calibrated to the 2D laser scanner 450 by assuming the position of the mobile device based on the geometry and position of the holder 441 relative to 2D laser scanner 450. In this embodiment, it is assumed that the holder that causes the mobile device to be positioned in the same manner. It should be appreciated that this type of calibration may not have a desired level of accuracy due to manufacturing tolerance variations and variations in the positioning of the mobile device 443 in the holder 441. In another embodiment, a calibration is performed each time a different mobile device 443 is used. In this embodiment, the user is guided (such as via the user interface/display 510) to direct the scanner 408 to scan a specific object, such as a door, that can be readily identified in the laser readings of the scanner 408 and in the camera-sensor 520 using an object recognition method.

Referring now to FIGS. 27-29, an embodiment is shown of a laser scanner 610. In this embodiment, the laser scanner 610 has a measuring head 622 and a base 624. The measuring head 622 is mounted on the base 624 such that the laser scanner 610 may be rotated about a vertical axis 623. In one embodiment, the measuring head 622 includes a gimbal point 627 that is a center of rotation about the vertical axis 623 and a horizontal axis 625. The measuring head 622 has a rotary mirror 626, which may be rotated about the horizontal axis 625. The rotation about the vertical axis may be about the center of the base 624. In one embodiment, the vertical axis 623 is coaxial with the center axis of the post 109, 209, 309. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 622 is further provided with an electromagnetic radiation emitter, such as light emitter 628, for example, that emits an emitted light beam 630. In one embodiment, the emitted light beam 630 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 630 is amplitude or intensity modulated, for example, with a sinusoidal waveform or with a rectangular waveform. The emitted light beam 630 is emitted by the light emitter 628 onto a beam steering unit, such as mirror 626, where it is deflected to the environment. A reflected light beam 632 is reflected from the environment by an object 634. The reflected or scattered light is intercepted by the rotary mirror 626 and directed into a light receiver 636. The directions of the emitted light beam 630 and the reflected light beam 632 result from the angular positions of the rotary mirror 626 and the measuring head 622 about the axes 625, 623, respectively. These angular positions in turn depend on the corresponding rotary drives or motors.

Coupled to the light emitter 628 and the light receiver 636 is a controller 638. The controller 638 determines, for a multitude of measuring points X, a corresponding number of distances d between the laser scanner 610 and the points X on object 634. The distance to a particular point X is determined based at least in part on the speed of light in air through which electromagnetic radiation propagates from the device to the object point X. In one embodiment the phase shift of modulation in light emitted by the laser scanner 610 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the 3D measurement device 110 takes place by rotating the rotary mirror 626 relatively quickly about axis 625 while rotating the measuring head 622 relatively slowly about axis 623, thereby moving the assembly in a spiral pattern. This is sometimes referred to as a compound mode of operation. In an exemplary embodiment, the rotary mirror rotates at a maximum speed of 5820 revolutions per minute. For such a scan, the gimbal point 627 defines the origin of the local stationary reference system. The base 624 rests in this local stationary reference system. In other embodiments, another mode of operation is provided wherein the 3D measurement device 110 rotates the rotary mirror 626 about the axis 625 while the measuring head 622 remains stationary. This is sometimes referred to as a helical mode of operation.

In an embodiment, the acquisition of the 3D coordinate values further allows for the generation of a 3D trajectory, such as the 3D trajectory (e.g. 3D path) of the gimbal point 627 for example. This 3D trajectory may be stored and combined or fused with other data, such as data from the 2D scanner and/or from an inertial measurement unit for example, and used to register 3D coordinate data. It should be appreciated that the 3D trajectory may be transformed from the gimbal point 627 to any other location on the system, such as the base unit.

In addition to measuring a distance d from the gimbal point 627 to an object point X, the laser scanner 610 may also collect gray-scale information related to the received optical power (equivalent to the term "brightness.") The gray-scale value may be determined at least in part, for example, by integration of the bandpass-filtered and amplified signal in the light receiver 636 over a measuring period attributed to the object point X.

The measuring head 622 may include a display device 640 integrated into the laser scanner 610. The display device 640 may include a graphical touch screen 641, which allows the operator to set the parameters or initiate the operation of the laser scanner 610. For example, the screen 641 may have a user interface that allows the operator to provide measurement instructions to the device, and the screen may also display measurement results.

The laser scanner 610 includes a carrying structure 642 that provides a frame for the measuring head 622 and a platform for attaching the components of the laser scanner 610. In one embodiment, the carrying structure 642 is made from a metal such as aluminum. The carrying structure 642 includes a traverse member 644 having a pair of walls 646, 648 on opposing ends. The walls 646, 648 are parallel to each other and extend in a direction opposite the base 624. Shells 650, 652 are coupled to the walls 646, 648 and cover the components of the laser scanner 610. In the exemplary embodiment, the shells 650, 652 are made from a plastic material, such as polycarbonate or polyethylene for example. The shells 650, 652 cooperate with the walls 646, 648 to form a housing for the laser scanner 610.

On an end of the shells 650, 652 opposite the walls 646, 648 a pair of yokes 654, 656 are arranged to partially cover the respective shells 650, 652. In the exemplary embodiment, the yokes 654, 656 are made from a suitably durable material, such as aluminum for example, that assists in protecting the shells 650, 652 during transport and operation. The yokes 654, 656 each includes a first arm portion 658 that is coupled, such as with a fastener for example, to the traverse 644 adjacent the base 624. The arm portion 658 for each yoke 654, 656 extends from the traverse 644 obliquely to an outer corner of the respective shell 650, 652. From the outer corner of the shell, the yokes 654, 656 extend along the side edge of the shell to an opposite outer corner of the shell. Each yoke 654, 656 further includes a second arm portion that extends obliquely to the walls 646,648. It should be appreciated that the yokes 654, 656 may be coupled to the traverse 644, the walls 646, 648 and the shells 650, 654 at multiple locations.

In an embodiment, on top of the traverse 644, a prism 660 is provided. The prism extends parallel to the walls 646, 648. In the exemplary embodiment, the prism 660 is integrally formed as part of the carrying structure 642. In other embodiments, the prism 660 is a separate component that is coupled to the traverse 644. When the mirror 626 rotates, during each rotation the mirror 626 directs the emitted light beam 630 onto the traverse 644 and the prism 660. In some embodiments, due to non-linearities in the electronic components, for example in the light receiver 636, the measured distances d may depend on signal strength, which may be measured in optical power entering the scanner or optical power entering optical detectors within the light receiver 2436, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 636.

Since the prism 2460 is at a known distance from the gimbal point 627, the measured optical power level of light reflected by the prism 660 may be used to correct distance measurements for other measured points, thereby allowing for compensation to correct for the effects of environmental variables such as temperature. In the exemplary embodiment, the resulting correction of distance is performed by the controller 638.

In an embodiment, the base 624 is coupled to a swivel assembly (not shown) such as that described in commonly owned U.S. Pat. No. 8,705,012 ('012), which is incorporated by reference herein. The swivel assembly is housed within the carrying structure 642 and includes a motor that is configured to rotate the measuring head 622 about the axis 623. In an embodiment, the angular/rotational position of the measuring head 622 about the axis 623 is measured by angular encoder. In the embodiments disclosed herein, the base (with or without the swivel assembly) may be mounted to the post 109, 209, 309.

An auxiliary image acquisition device 666 may be a device that captures and measures a parameter associated with the scanned area or the scanned object and provides a signal representing the measured quantities over an image acquisition area. The auxiliary image acquisition device 666 may be, but is not limited to, a pyrometer, a thermal imager, an ionizing radiation detector, or a millimeter-wave detector. In an embodiment, the auxiliary image acquisition device 766 is a color camera.

In an embodiment, a central color camera (first image acquisition device) 612 is located internally to the scanner and may have the same optical axis as the 3D scanner device. In this embodiment, the first image acquisition device 612 is integrated into the measuring head 622 and arranged to acquire images along the same optical pathway as emitted light beam 630 and reflected light beam 632. In this embodiment, the light from the light emitter 628 reflects off a fixed mirror 2416 and travels to dichroic beam-splitter 618 that reflects the light 617 from the light emitter 628 onto the rotary mirror 626. In an embodiment, the mirror 626 is rotated by a motor 637 and the angular/rotational position of the mirror is measured by angular encoder 634. The dichroic beam-splitter 618 allows light to pass through at wavelengths different than the wavelength of light 617. For example, the light emitter 628 may be a near infrared laser light (for example, light at wavelengths of 780 nm or 1150 nm), with the dichroic beam-splitter 618 configured to reflect the infrared laser light while allowing visible light (e.g., wavelengths of 400 to 700 nm) to transmit through. In other embodiments, the determination of whether the light passes through the beam-splitter 618 or is reflected depends on the polarization of the light. The digital camera 612 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 623 and by steering the mirror 626 about the axis 625. One or both of the color cameras 612, 666 may be used to colorize the acquired 3D coordinates (e.g. the point cloud).

In an embodiment, when the 3D scanner is operated in compound mode, a compound compensation may be performed to optimize the registration of date by combining or fusing sensor data (e.g. 2D scanner, 3D scanner and/or IMU data) using the position and orientation (e.g. trajectory) of each sensor.

It should be appreciated that while embodiments herein refer to the 3D scanner 610 as being a time-of-flight (phase shift or pulsed) scanner, this is for exemplary purposes and the claims should not be so limited. In other embodiments, other types of 3D scanners may be used, such as but not limited to structured light scanners, area scanners, triangulation scanners, photogrammetry scanners, or a combination of the foregoing.

Figure 30:
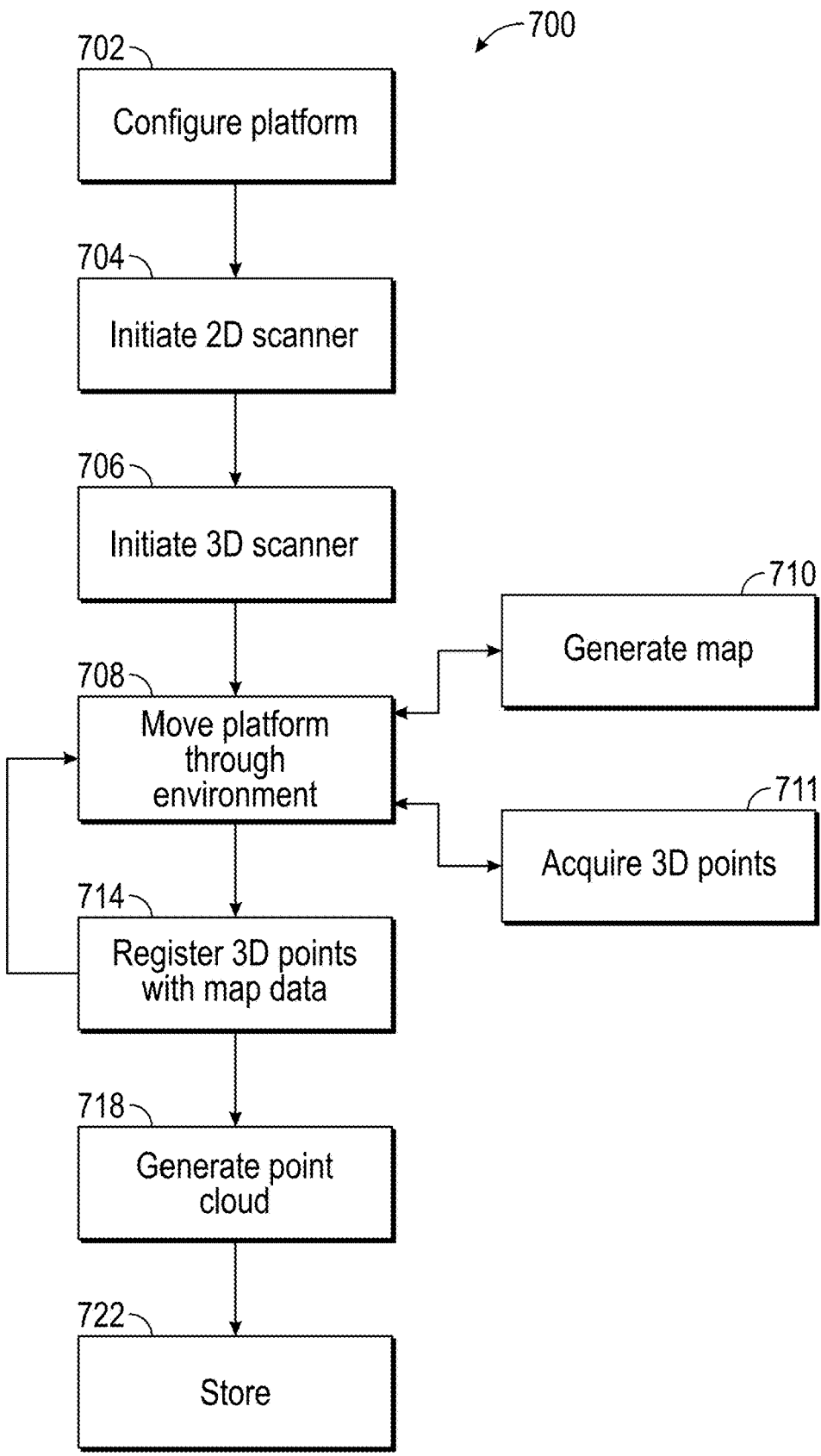
FIG. 30 is a flow diagram of a method of scanning an environment using the mobile scanning platform of FIG. 1, FIG. 5 or FIG. 6.
Figure 31:
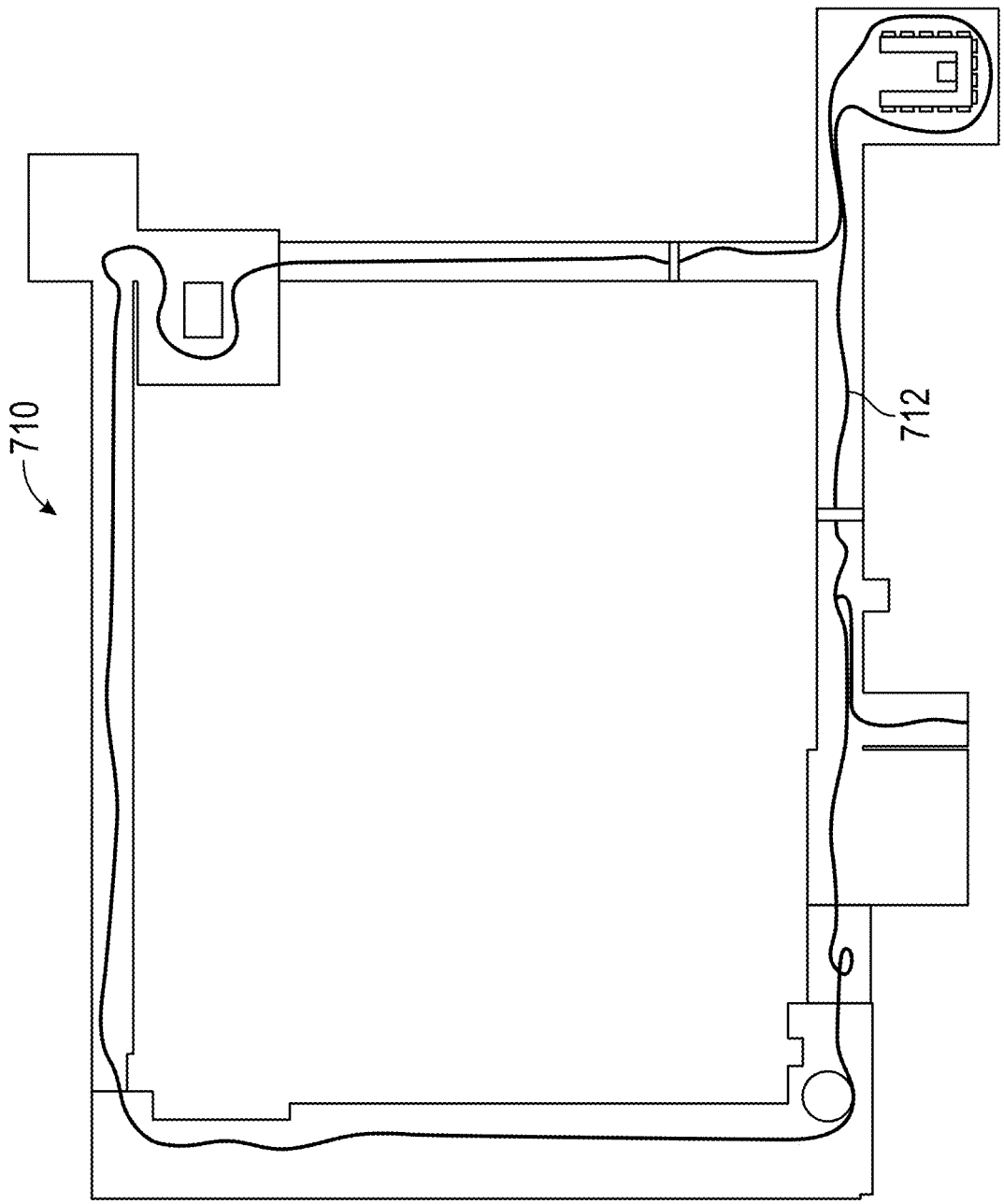
FIG. 31 is a plan view of a 2D map generated during the method of FIG. 30.

Referring now to FIGS. 30-32, an embodiment is shown of a method 700 for scanning an environment with the mobile scanning platform 100, 200, 300. The method 700 starts in block 702 where the platform is configured. In the embodiment where the platform is platform 100, 200, the configuring may include attaching the 2D scanner 108, 208 to the respective arm or holder, and the 3D measurement device 110, 210 to the post 109, 209. In an embodiment where the platform is the platform 300, the configuring may include determining a path for the platform 300 to follow and defining stationary scan locations (if desired). In an embodiment, the path may be determined using the system and method described in commonly owned U.S. patent application Ser. No. 16/154,240, the contents of which are incorporated by reference herein. Once the path is defined, the 2D scanner 308 and 3D scanner 310 may be coupled to the platform 300. It should be appreciated that in some embodiments, the platform 300 may be remotely controlled by an operator and the step of defining a path may not be performed.

Once the platform 100, 200, 300 is configured, the method 700 proceeds to block 704 where the 2D scanner 108, 208, 308 is initiated and the 3D measurement device 110, 210, 310 is initiated in block 706. It should be appreciated that when operation of the 2D scanner 108, 208, 308 is initiated, the 2D scanner starts to generate a 2D map of the environment as described herein. Similarly, when operation of the 3D measurement device 110, 210, 310 is initiated, the coordinates of 3D points in the environment are acquired in a volume about the 3D scanner.

The method 700 then proceeds to block 708 where the platform 100, 200, 300 is moved through the environment. As the platform 100, 200, 300 is moved, both the 2D scanner 108, 208, 308 and the 3D measurement device 110, 210, 310 continue to operate. This results in the generation of both a 2D map 710 (FIG. 31) and the acquisition of 3D points 711. In an embodiment, as the 2D map is generated, the location or path 712 of the platform 100, 200, 300 is indicated on the 2D map. In an embodiment, the platform 100 may include a user interface that provides feedback to the operator during the performing of the scan. In an embodiment, a quality attribute (e.g. scan density) of the scanning process may be determined during the scan. When the quality attribute crosses a threshold (e.g. scan density too low), the user interface may provide feedback to the operator. In an embodiment, the feedback is for the operator to perform a stationary scan with the 3D scanner.

The method 700 then proceeds to block 714 where the acquired 3D coordinate points are registered into a common frame of reference. It should be appreciated that since the platform 100, 200, 300 is moving while the 3D measurement device 110, 210, 310 is acquiring data, the local frame of reference of the 3D scanner is also changing. Using the position and pose data from the 2D scanner 108, 208, 308, the frame of reference of the acquired 3D coordinate points may be registered into a global frame of reference. In an embodiment, the registration is performed as the platform 100, 200, 300 is moved through the environment. In another embodiment, the registration is done when the scanning of the environment is completed.

The registration of the 3D coordinate points allows the generation of a point cloud 716 (FIG. 32) in block 718. In an embodiment, a representation of the path 720 of the platform 100, 200, 300 is shown in the point cloud 716. In some embodiments, the point cloud 716 is generated and displayed to the user as the platform 100, 200, 300 moves through the environment being scanned. In these embodiments, blocks 708, 714, 718 may loop continuously until the scanning is completed. With the scan complete, the method 700 ends in block 722 where the point cloud 716 and 2D map 710 are stored in memory of a controller or processor system.

Technical effects and benefits of some embodiments include providing a system and a method that facilitate the rapid scanning of an environment using a movable platform that simultaneously generates a 2D map of the environment and a point cloud.

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system for measuring three-dimensional (3D) coordinate values of an environment, the system comprising:
    a movable base unit;
    a first scanner coupled to the base unit, the scanner having a light source, an image sensor and a controller, the light source emitting a first beam of light and the image sensor being arranged to receive a first reflected light of the first beam of light;
    a second scanner coupled to the base unit, the second scanner operable to selectively measure 3D coordinates of surfaces in the environment, the second scanner having a rotary mirror arranged to reflect an emitted second beam of light and a second reflected light; and
    one or more processors operably coupled to the base unit, the first scanner and the second scanner, the one or more processors being responsive to nontransitory executable instructions for performing a method comprising:
        causing the first scanner to determine first plurality of coordinate values in a first frame of reference based at least in part on the emitted first beam of light and the received first reflected light;
        causing the second scanner to determining a second plurality of 3D coordinate values in a second frame of reference as the base unit is moved from a first position to a second position, the determining of the first coordinate values and the second plurality of 3D coordinate values being performed simultaneously; and
        registering the second plurality of 3D coordinate values a common frame of reference based at least in part on the first plurality of coordinate values.

2. The system of claim 1, wherein the instructions for performing the method includes generating a map of the environment based at least in part on the first plurality of coordinate values.

3. The system of claim 2, wherein the generating of the map and the registration of the second plurality of 3D coordinate values is performed simultaneously.

4. The system of claim 2, wherein the instructions for performing the method further include generating a trajectory through the environment based at least in part on the first plurality of coordinate values.

5. The system of claim 4, further comprising a display coupled to the base unit, wherein the instructions for performing the method further include generating a point cloud based on the registered second plurality of 3D coordinate values and displaying the point cloud on the display to an operator while the second plurality of 3D coordinate values are being determined.

6. The system of claim 5, wherein the instructions for performing the method further comprise displaying the trajectory on the display.

7. The system of claim 6, wherein the instructions for performing the method further comprise repeating the instructions of claim 6 until the scanning of the environment is completed.

8. The system of claim 7, further comprising storing the point cloud, the map, and the trajectory in a memory once the scanning of the environment is completed.

9. The system of claim 1, wherein the second scanner is a time-of-flight (TOF) coordinate measurement device configured to measure the 3D coordinate values in a volume about the second scanner.

10. The system of claim 1, wherein the second scanner is a structured light area scanner.

11. The system of claim 1, wherein the base unit includes a plurality of wheels.

12. The system of claim 1, wherein the base unit is configured to be carried by an operator.

13. The system of claim 1, wherein the base unit includes a plurality of wheels and a plurality of motors that rotate the plurality of wheels.

14. The system of claim 13, wherein the instructions for performing the method further include moving the base unit though the environment in an autonomous manner.

15. The system of claim 13, wherein the instructions for performing the method further include moving the base unit though the environment in a semi-autonomous manner.

16. The system of claim 1, wherein the registering of the second plurality of 3D coordinate values in the common frame of reference is performed while the base unit is moved from the first position to the second position.

17. The system of claim 1, wherein the registering of the second plurality of 3D coordinate values in the common frame of reference is performed when the base unit is at the second position.

18. The system of claim 1, wherein the first scanner and the second scanner are removably coupled to the base unit, and the first scanner and second scanner may be operated as an independent device separate from the base unit or each other.

19. The system of claim 1, wherein:
   the second scanner included a color camera; and
   the method further comprises causing the color camera to acquire color data and associating color data with second plurality of 3D coordinate values.

20. The system of claim 1, wherein the method further comprises analyzing a tracking quality attribute of the second plurality of 3D coordinates and providing feedback to the operator.

* * * * *